US012638891B2

(12) United States Patent
Zheng

(10) Patent No.: US 12,638,891 B2
(45) Date of Patent: May 26, 2026

(54) ELECTRONIC DEVICE AND MOVEMENT METHOD APPLIED TO ELECTRONIC DEVICE

(71) Applicant: Lenovo (Beijing) Limited, Beijing (CN)

(72) Inventor: Yingce Zheng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 340 days.

(21) Appl. No.: 18/453,029

(22) Filed: Aug. 21, 2023

(65) Prior Publication Data

US 2024/0077915 A1    Mar. 7, 2024

(30) Foreign Application Priority Data

Aug. 29, 2022    (CN) .......................... 202211038527.4

(51) Int. Cl.
*G06F 1/16*        (2006.01)
(52) U.S. Cl.
CPC .......... *G06F 1/1681* (2013.01); *G06F 1/1622* (2013.01)
(58) Field of Classification Search
CPC ..... G06F 1/1622; G06F 1/1681; G06F 1/1616
See application file for complete search history.

(56) References Cited

U.S. PATENT DOCUMENTS

| | | | | |
|---|---|---|---|---|
| 8,437,146 B2 * | 5/2013 | Ahn | .................... | H04M 1/0212 |
| | | | | 361/755 |
| 8,537,529 B2 * | 9/2013 | Qiu | ......................... | G06F 1/162 |
| | | | | 361/679.02 |
| 8,689,405 B2 * | 4/2014 | Yu | ............................ | E05D 3/10 |
| | | | | 312/223.1 |
| 9,198,312 B2 * | 11/2015 | Zhang | ................. | H04M 1/0212 |
| 2004/0151411 A1 * | 8/2004 | Chang | ..................... | G06F 1/162 |
| | | | | 384/247 |
| 2008/0120805 A1 * | 5/2008 | Su | ......................... | G06F 1/1681 |
| | | | | 16/239 |
| 2011/0110027 A1 * | 5/2011 | Hu | ........................ | G06F 1/1681 |
| | | | | 361/679.07 |

* cited by examiner

*Primary Examiner* — Abhishek M Rathod
*Assistant Examiner* — Keon Kim
(74) *Attorney, Agent, or Firm* — ANOVA LAW GROUP, PLLC

(57)        ABSTRACT

An electronic device includes a first body, a second body, and a connection assembly. The connection assembly connects the first body and the second body and includes a first part and a second part. The first part is configured to allow the first body to move relative to the second body in a first motion mode. The second part is configured to allow the first body to move relative to the second body in a second motion mode. The first body moves in the first motion mode through the first part to a position satisfying a first position relationship with the second body. Movement of the first body in the second motion mode through the second part is impacted.

15 Claims, 30 Drawing Sheets

7112

711

7111

61

66(72)

C

A

51

87

B

A

711

83

ELECTRONIC DEVICE AND MOVEMENT METHOD APPLIED TO ELECTRONIC DEVICE

CROSS-REFERENCE TO RELATED APPLICATION

The present disclosure claims priority to Chinese Patent Application No. 202211038527.4, filed on Aug. 29, 2022, the entire content of which is incorporated herein by reference.

TECHNICAL FIELD

The present disclosure relates to an electronic device and a movement method applied to the electronic device.

BACKGROUND

As technology continues to develop, an electronic device often has different application modes through different movement methods. However, this type of electronic devices is easy to be damaged.

SUMMARY

Embodiments of the present disclosure provide an electronic device including a first body, a second body, and a connection assembly. The connection assembly connects the first body and the second body and includes a first part and the second part. The first part is configured to allow the first body to move relative to the second body in a first motion mode. The second part is configured to allow the first body to move relative to the second body in a second motion mode. The first body moves in the first motion mode through the first part to a position satisfying a first position relationship with the second body. The movement of the first body in the second motion mode through the second part is impacted.

Embodiments of the present disclosure provide a movement method of an electronic device. The method includes under a first force, moving a first body in a first motion mode relative to a second body through a first part of a connection assembly, and under a second force, moving the first body in a second motion mode relative to the second body through a second part of the connection assembly. When the first body moves in the first motion mode through the first part to a position satisfying a first position relationship with the second body, movement of the first body in the second motion mode through the second part is impacted.

3

Figure 30:
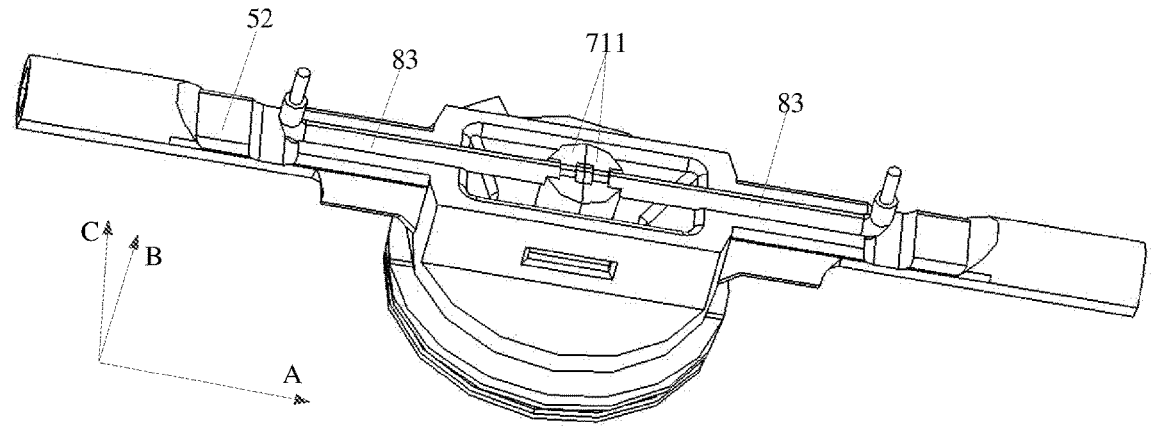
FIG. 30 illustrates a schematic structural diagram of the connection assembly in FIG. 23 in a position-limiting state.
Figure 31:
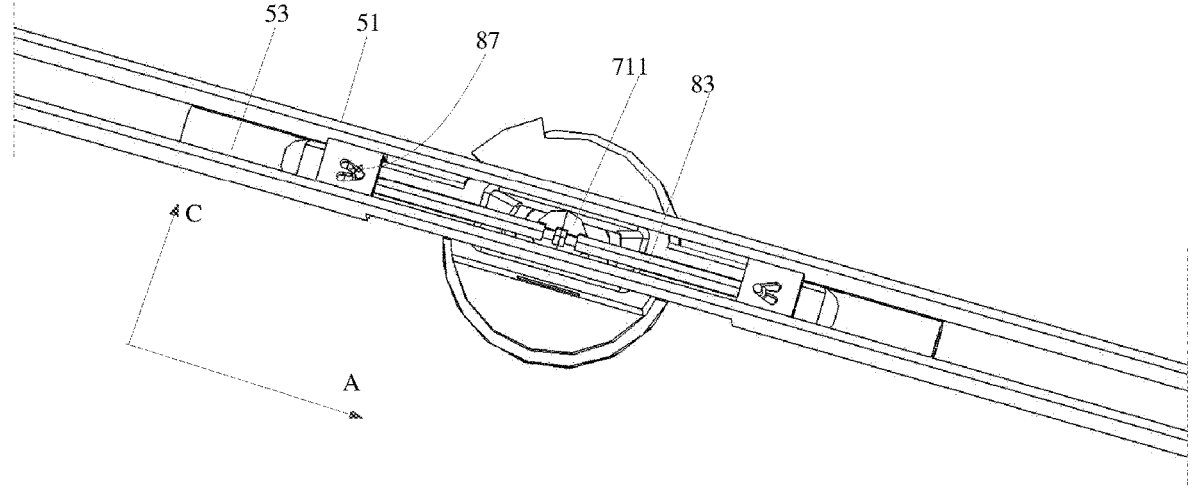

FIG. 31 illustrates a schematic diagram showing structural cooperation between the switch rod and the direction guide groove in the state of FIG. 30.

Figure 32:
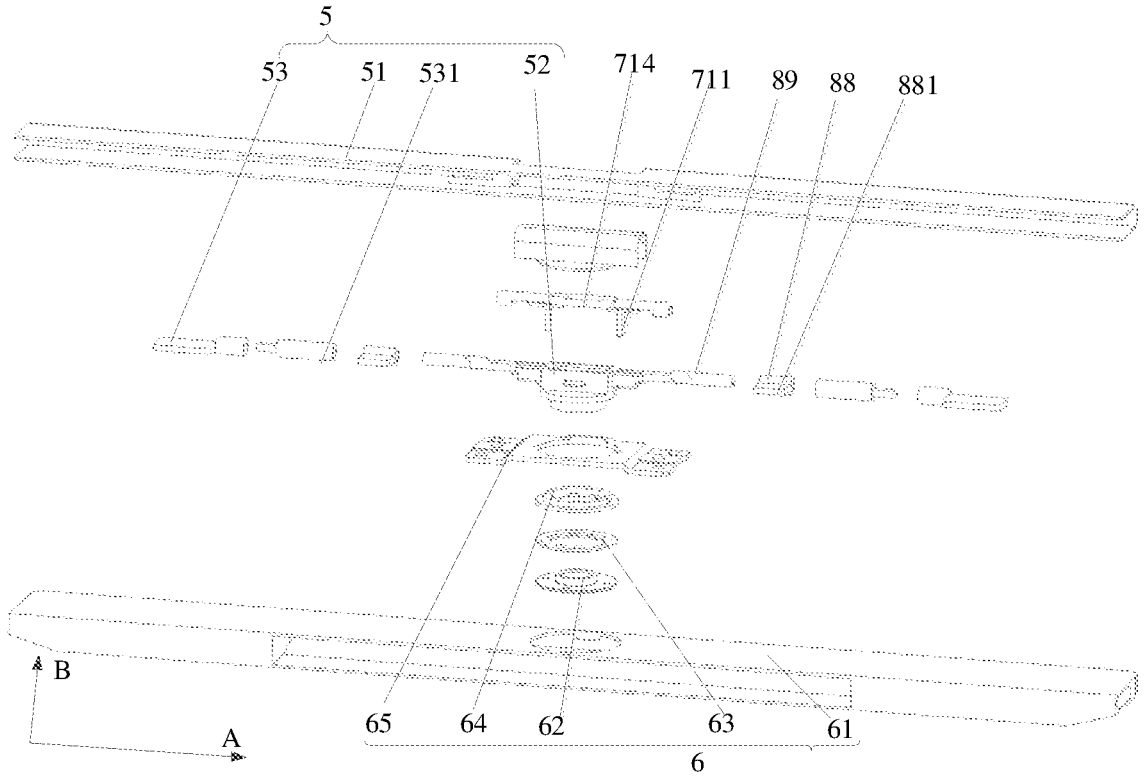

FIG. 32 illustrates a schematic diagram showing a fifth exploded structure of a connection assembly according to some embodiments of the present disclosure.

Figure 33:
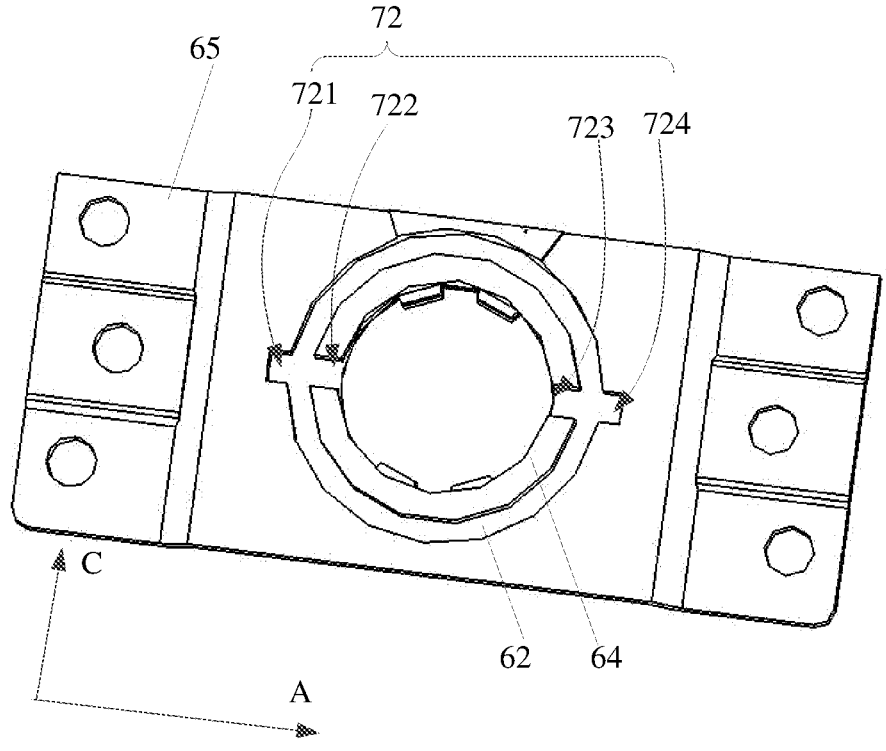

FIG. 33 illustrates a schematic structural diagram of a second structure member in a connection assembly in FIG. 32.

Figure 34:
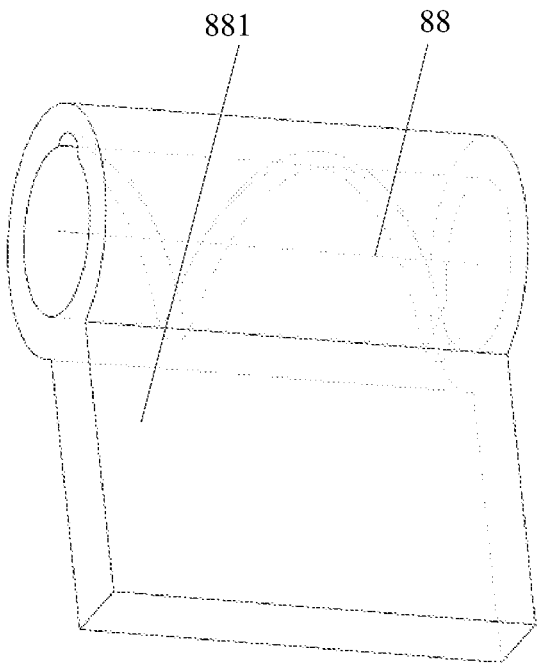

FIG. 34 illustrates a schematic structural diagram of a spiral guide rod in FIG. 32.

Figure 35:
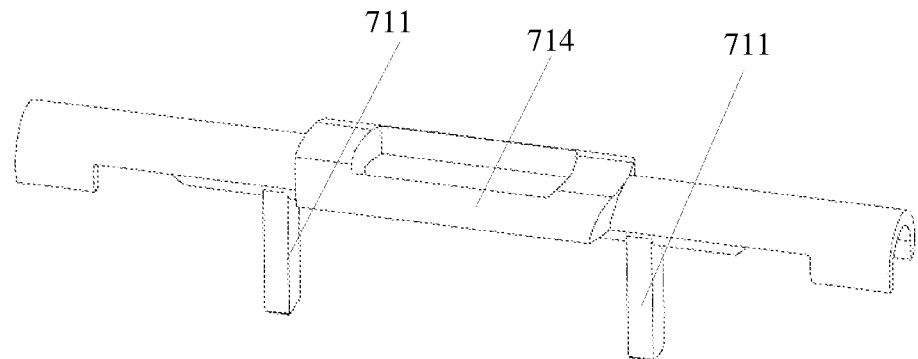

FIG. 35 illustrates a schematic structural diagram of a position-limiting guide rod in FIG. 32.

Figure 36:
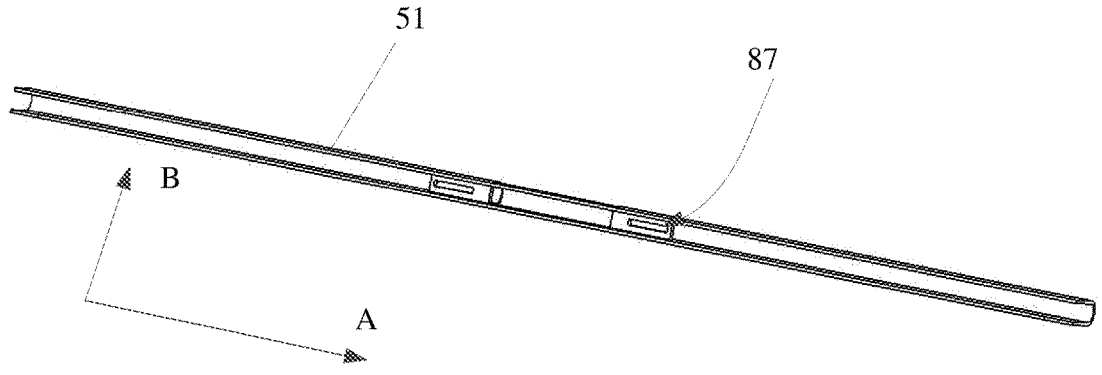

FIG. 36 illustrates a schematic structural diagram of a direction guide groove in the connection assembly in FIG. 32.

Figure 37:
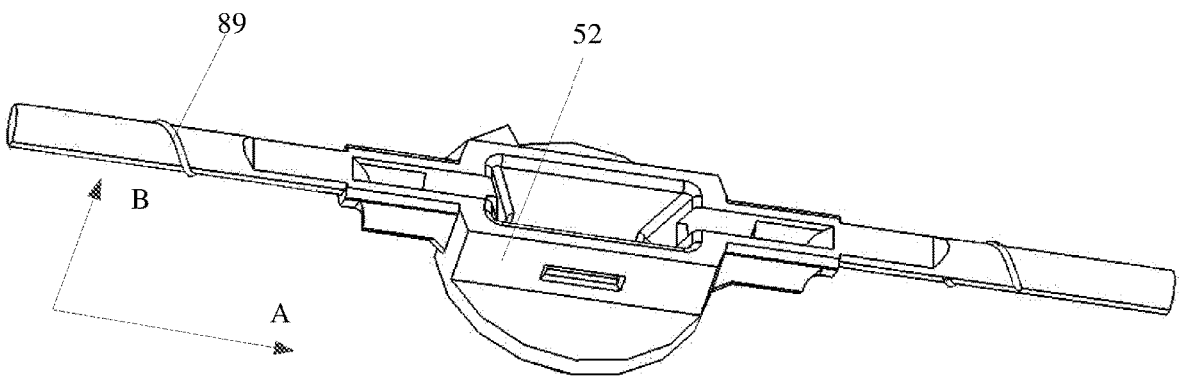

FIG. 37 illustrates a schematic structural diagram of a T-shaped shaft body in FIG. 32.

Figure 38:
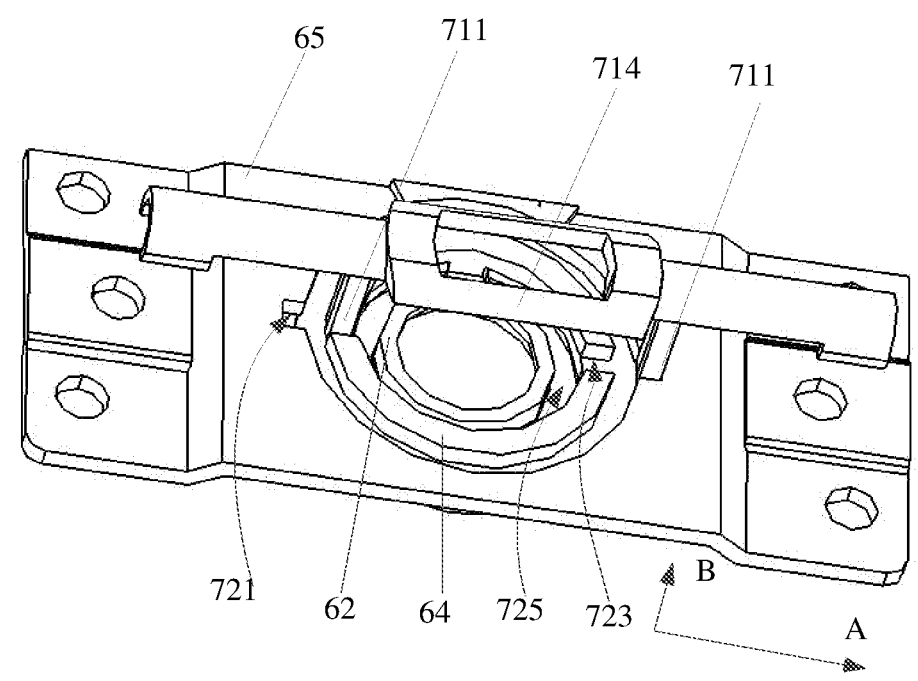

FIG. 38 illustrates a schematic structural diagram of a connection assembly in FIG. 32 in a position-limiting state.

Figure 39:
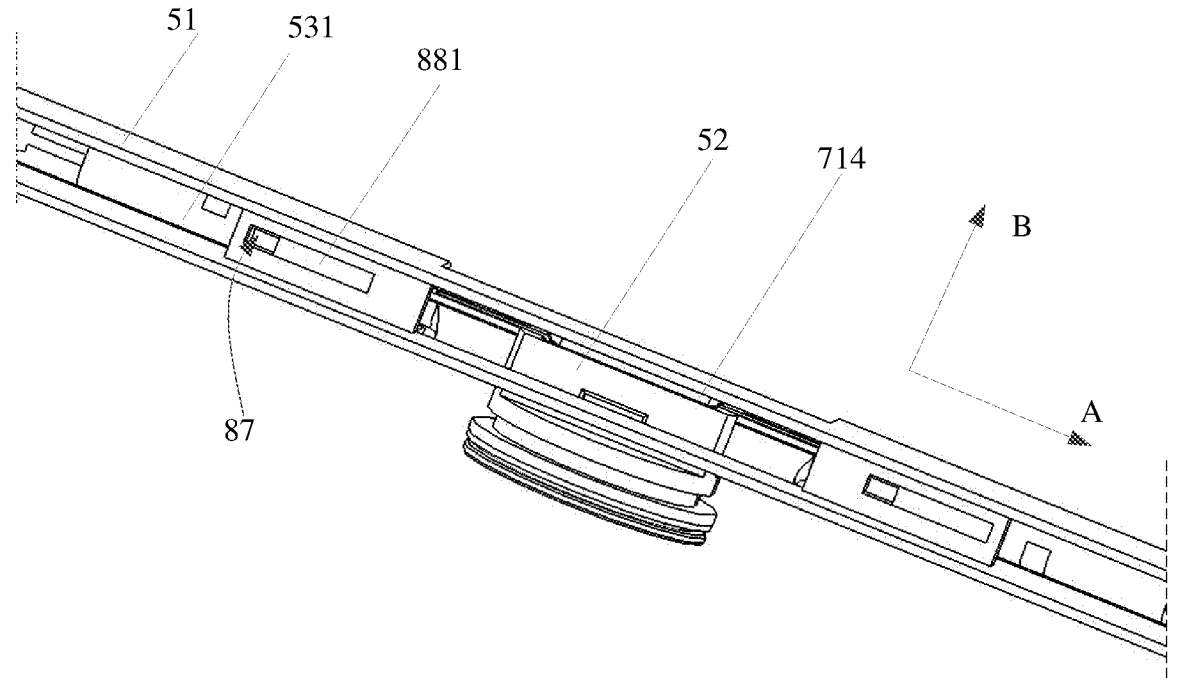

FIG. 39 illustrates a schematic diagram showing structural cooperation between the position-limiting guide rod and the direction guide groove in the state of FIG. 38.

Figure 40:
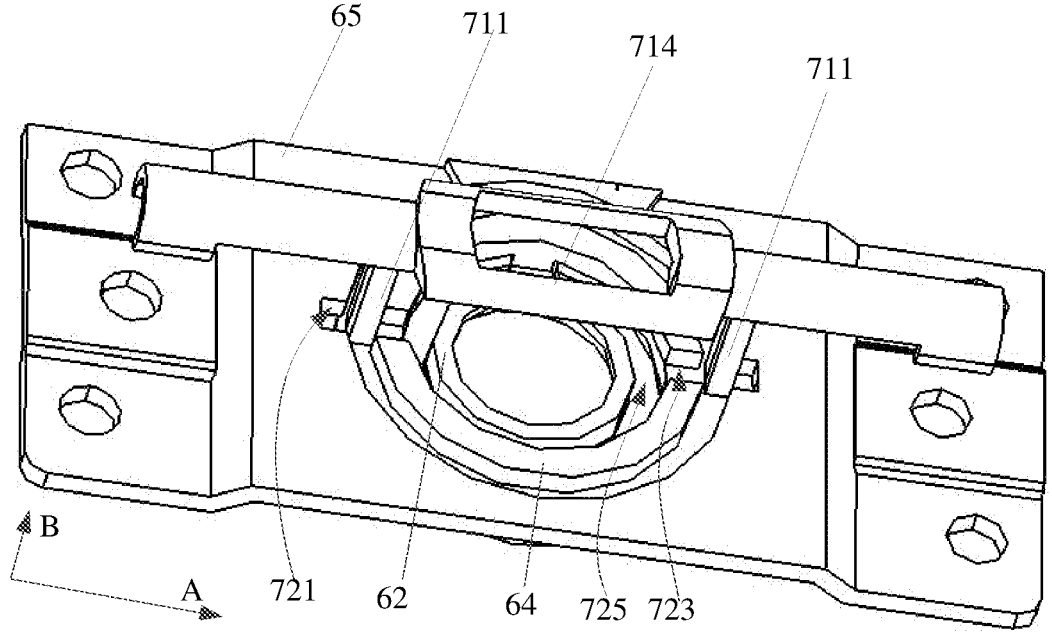

FIG. 40 illustrates a schematic structural diagram of a connection assembly in FIG. 32 in a non-position-limiting state.

Figure 41:
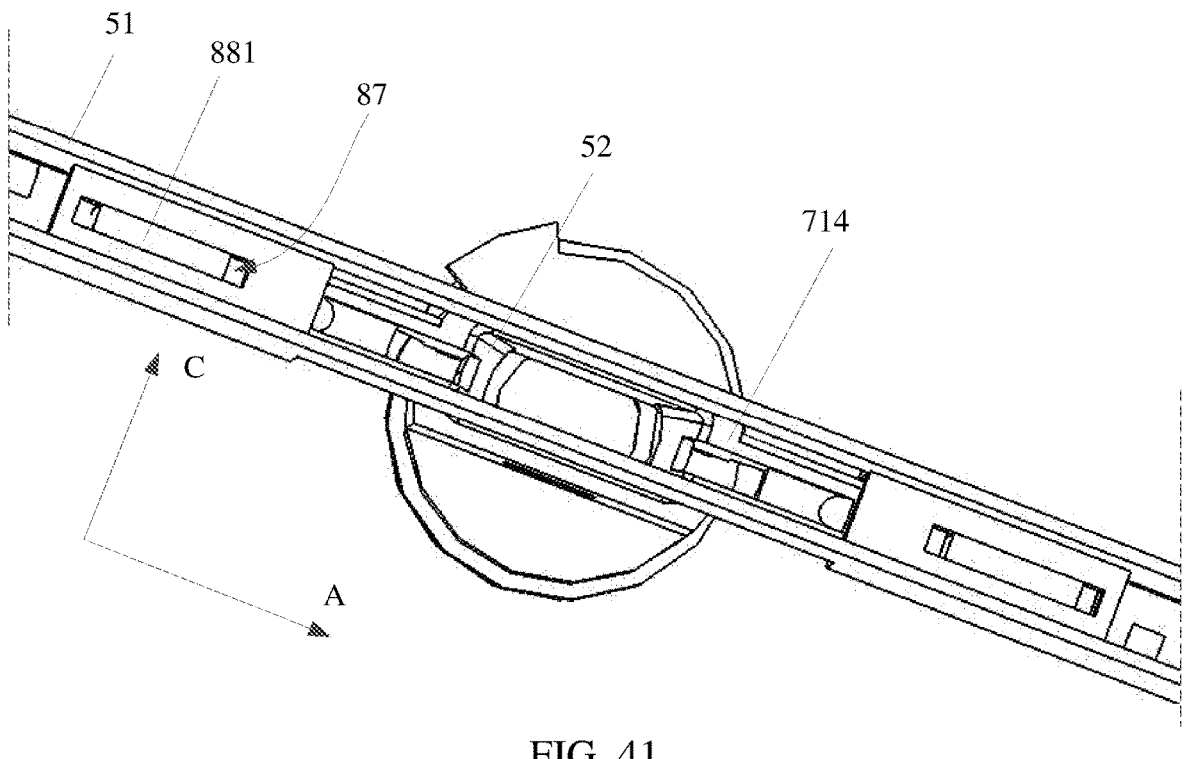

FIG. 41 illustrates a schematic diagram showing structural cooperation between the position-limiting rod and the direction guide groove in the state of FIG. 40.

4 part 6. The first part 5 can be configured to allow the first body 2 to move relative to the second body 3 in a first motion mode. The second part 6 can be configured to allow the first body 2 to move relative to the second body 3 in a second motion mode.

The first body 2 can move in the first motion mode through the first part 5 to a position satisfying a first position relationship with the second body 3, which impacts the movement of the first body 2 in the second motion mode through the second part 6.

The two bodies of the electronic device can move in different motion modes relative to the connection assembly to have different application postures to adapt to different application scenes or working states. When an angle between the two bodies is small or the two bodies do not have an angle, if the body can move arbitrarily, two surfaces of the two bodies that face each other and satisfy a parallel condition can be damaged. Thus, the lifetime or aesthetics of the product can be impacted.

To address this issue, embodiments of the present disclosure provide an electronic device 1. The first body 2 of the electronic device 1 can perform a movement in the first motion mode and a movement in the second motion mode independently relative to the second body 3 by arranging the connection assembly 4. Moreover, when the first body moves in the first motion mode to a position satisfying the first position relationship with the second body 3, the second motion mode of the first body 2 relative to the second body 3 can be impacted, i.e., limited. Thus, when the first body 2

Reference numerals:

| | | |
|---|---|---|
| 1 Electronic device | 2 First body | 3 Second body |
| 4 Connection assembly | 5 First part | 51 U-shape connection shell |
| 52 T-shape axis body | 53 Flipping axis | 531 Shaft center |
| 532 Second arc member | 6 Second part | 61 Connection frame |
| 62 Flange | 63 Lower chuck | 64 Upper chuck |
| 65 Base | 66 Position-limiting slot | 7 Impact member |
| 71 First structure member | 711 Position-limiting member | 7111 First through-hole |
| 7112 Second through-hole | 712 Connection rod | 713 Elastic member |
| 714 Position-limiting guide rod | | 72 Second structure member |
| 721 First position-limiting slot | | 722 Second position-limiting slot |
| 723 Third position-limiting slot | | 724 Fourth position-limiting slot |
| 725 Annular channel | 8 Control assembly | 81 Switch member |
| 82 First arc member | 83 Switch rod | 831 Switcher |
| 84 Top member 84 | 841 Accommodation groove | 85 Rope body |
| 851 Adjustment end | 86 Compression wheel | 87 Direction guide groove |
| 88 Spiral guide rod | 881 Direction guide member | 89 Spiral rod |
| A First direction | B Second direction | C Third direction |

DETAILED DESCRIPTION OF THE EMBODIMENTS

Embodiments of the present disclosure are described in detail below in connection with the accompanying drawings of embodiments of the present disclosure. Described embodiments are only some embodiments of the present disclosure and not all embodiments. Embodiments are provided to enable a more thorough understanding of the present disclosure and to fully convey the scope of the present disclosure to those skilled in the art.

Unless otherwise stated, the technical terms or scientific terms used in the present disclosure should be understood in common meanings by those skilled in the art.

Figure 1:
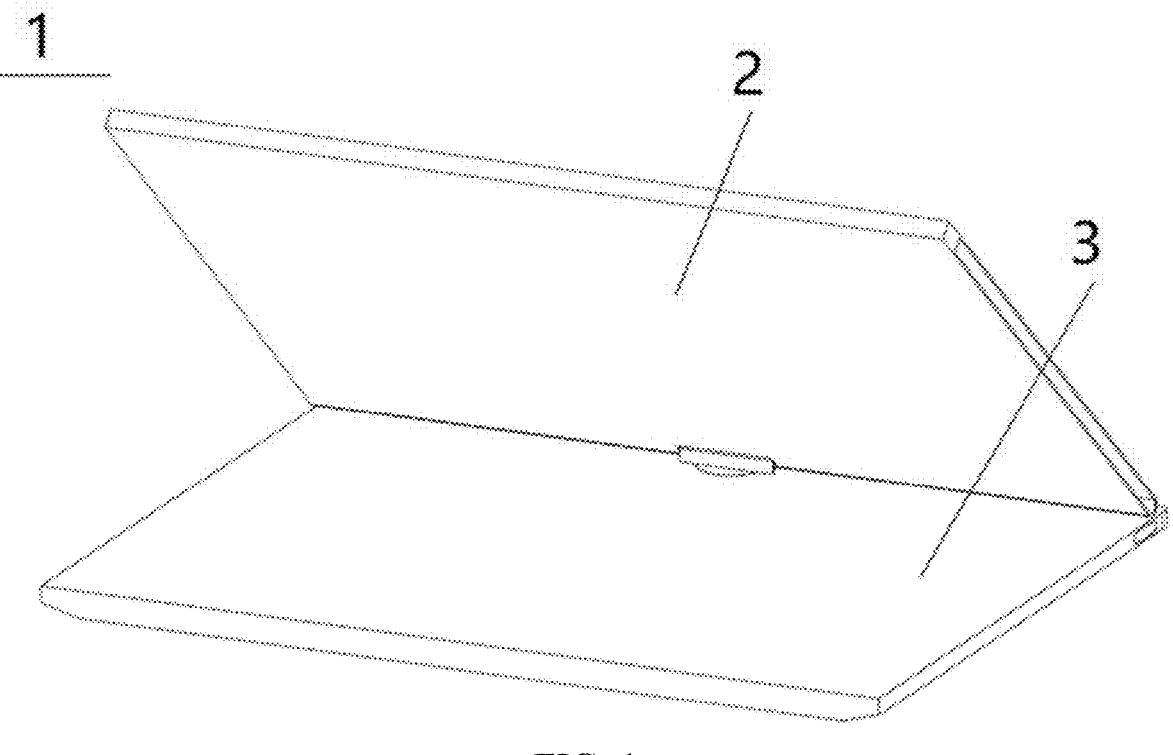
FIG. 1 illustrates a schematic diagram showing the movement of an electronic device in a first movement mode according to some embodiments of the present disclosure.
Figure 2:
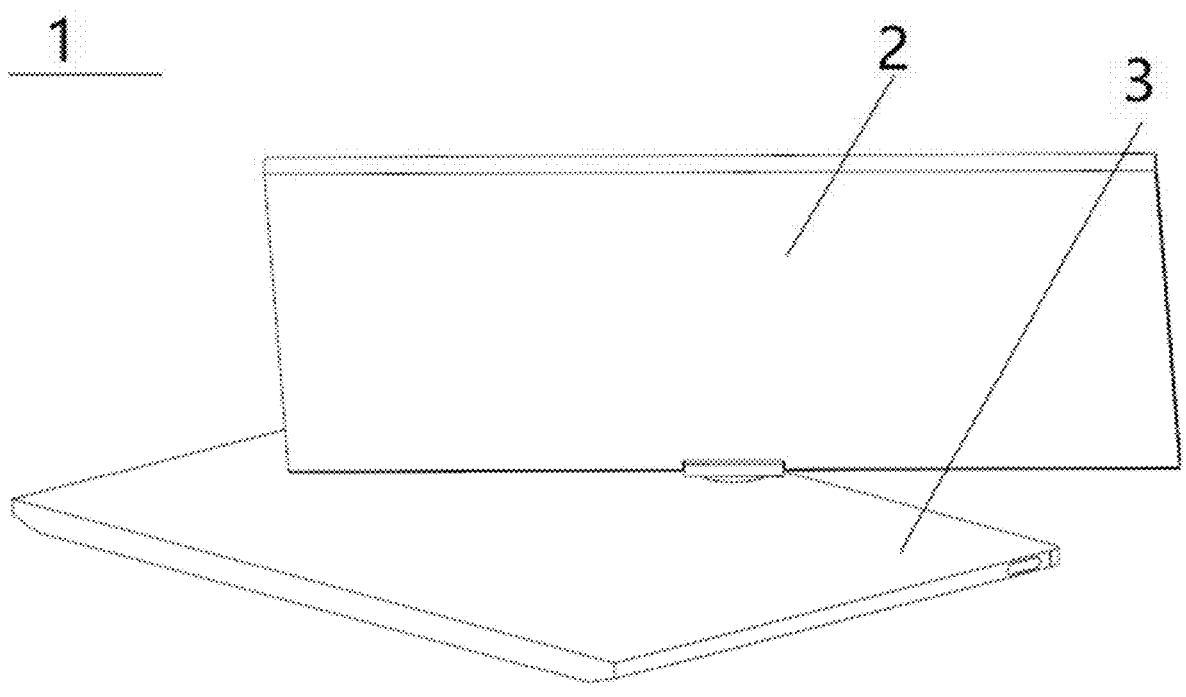
FIG. 2 illustrates a schematic diagram showing the movement of an electronic device in a second movement mode according to some embodiments of the present disclosure.

As shown in FIG. 1 and FIG. 2, embodiments of the present disclosure provide an electronic device 1, including a first body 2, a second body 3, and a connection assembly 4 connected to the first body 2 and the second body 3. The connection assembly 4 includes a first part 5 and a second and the second body 3 satisfy the first position relationship, the second movement can be limited. Then, if the movement in the first motion mode is flipping, and the movement in the second motion mode is rotation, the second movement can be avoided when the first body 2 has the first position relationship with the second body 3. Therefore, unnecessary damage can be prevented.

The electronic device 1 can include but is not limited to a laptop computer. The first body 2 and the second body 3 can be a screen end and a system end of the laptop computer, respectively, for example, a plate-shaped or block-shaped structure. Embodiments of the present disclosure are described in detail by taking the laptop computer as an example. The first body 2 and the second body 3 can be the screen end and the system end of the laptop computer, respectively. The first body 2 can perform the movement in the first motion mode and the movement in the second motion mode independently relative to the second body 3. The first motion mode and the second motion mode can be but are not limited to flipping around a horizontal axis and rotation around a vertical axis. The horizontal axis and the vertical axis can be perpendicular to each other.

Figure 3:
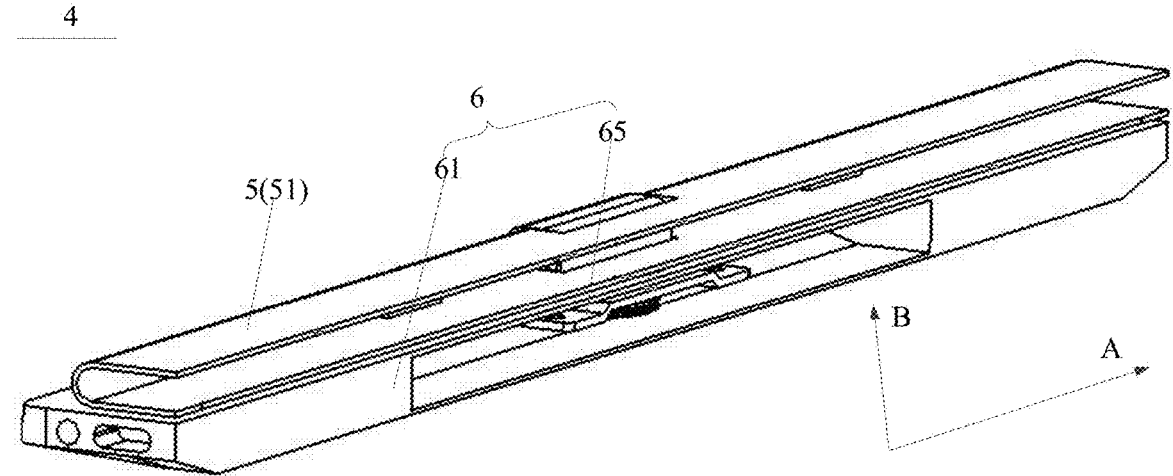
FIG. 3 illustrates a schematic diagram showing the first state of a connection assembly of an electronic device according to some embodiments of the present disclosure.
Figure 4:
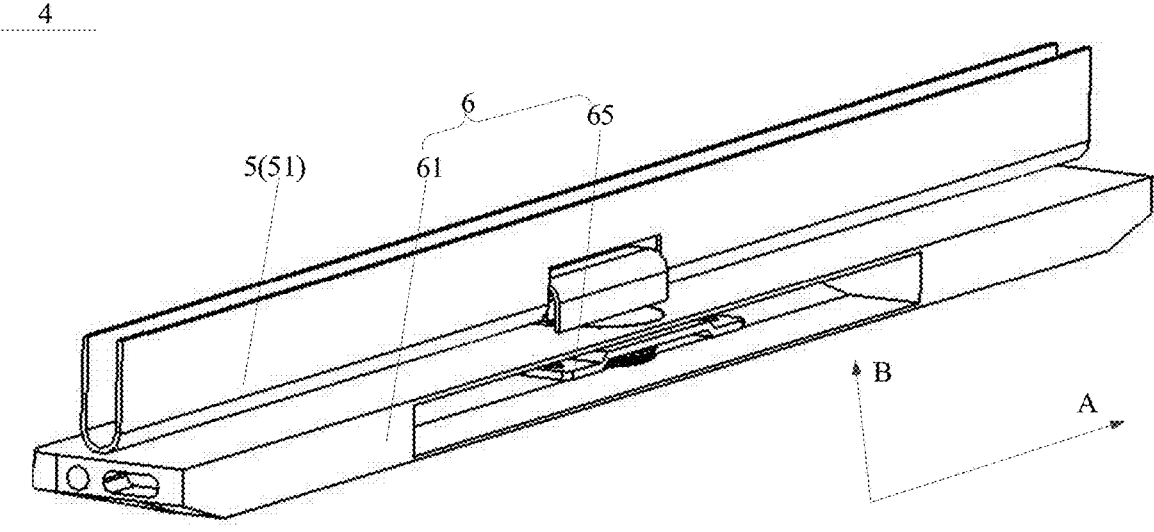
FIG. 4 illustrates a schematic diagram showing a second state of a connection assembly of an electronic device according to some embodiments of the present disclosure.

As shown in FIG. 3 and FIG. 4, the connection assembly 4 is a connection structure, which is not limited to a rotation shaft assembly. The connection assembly 4 includes the first part 5 and the second part 6 connected to each other. The first part 5 can be configured to be connected to the first body 2. The second part 6 can be connected to the second body 3. For example, the first part 5 can at least include a horizontal axis, and the second part 6 can at least include a vertical axis. In some other embodiments, the first part 5 can include the horizontal axis and the vertical axis. The first part 5 is mounted at the second part 6. Two axes cooperate to form a T-shaped axis shown in FIG. 5. Then, the first body 2 can realize the movement in the first motion mode through the first part 5, i.e., flipping 360° to open and close the screen end, and the movement in the second motion mode through the second part 6, i.e., rotation 360° to switch display directions at the screen end. When the first body 2 moves in the first motion mode (flipping) through the first part 5 to a position satisfying the first position relationship with the second body 3, the movement of the first body 2 in the second motion mode (rotation) through the second body 6 can be impacted, i.e., limited. Thus, when the first body 2 and the second body 3 satisfy the first position relationship, the first body 2 cannot perform the movement in the second motion mode (rotation) relative to the second body 3. The first position relationship can be, but is not limited to, a position relationship before the first body flips relative to the second body 3 to a predetermined angle. The predetermined angle can be greater than 45° for the laptop computer, i.e., 90°.

Accordingly, as shown in FIG. 2, embodiments of the present disclosure provide the electronic device 1. In some embodiments, the first body 2 can move relative to the second body 3 in the first motion mode through the first part 5 to a position satisfying a second position relationship. The movement of the first body 2 in the second motion mode through the second part 6 may not be impacted.

That is, when the first body 2 moves relative to the second body 3 in the first motion mode to a position satisfying the second positional relationship, the first body 2 can then move in the second motion mode, i.e., rotate, through the second part 6. The second positional relationship can include but is not limited to a position relationship after the first body 2 flips to a predetermined angle. That is, the first position relationship is released.

Figure 5:
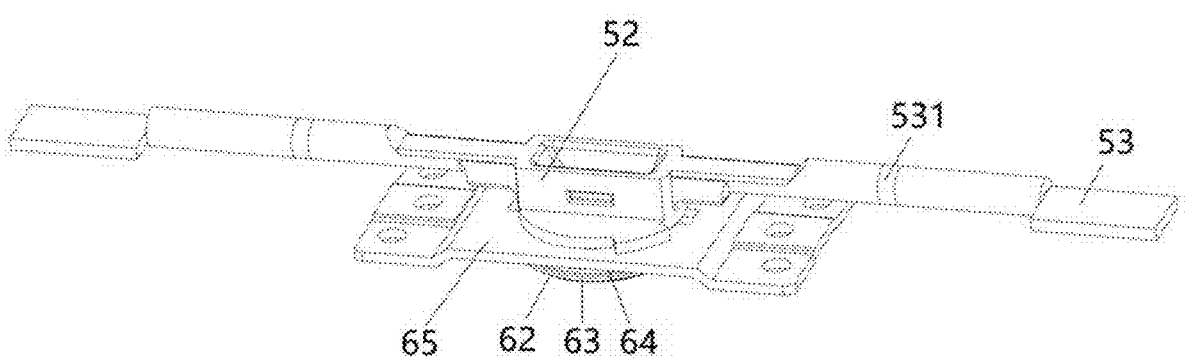
FIG. 5 illustrates a schematic diagram showing a shaft structure of a connection assembly according to some embodiments of the present disclosure.
Figure 6:
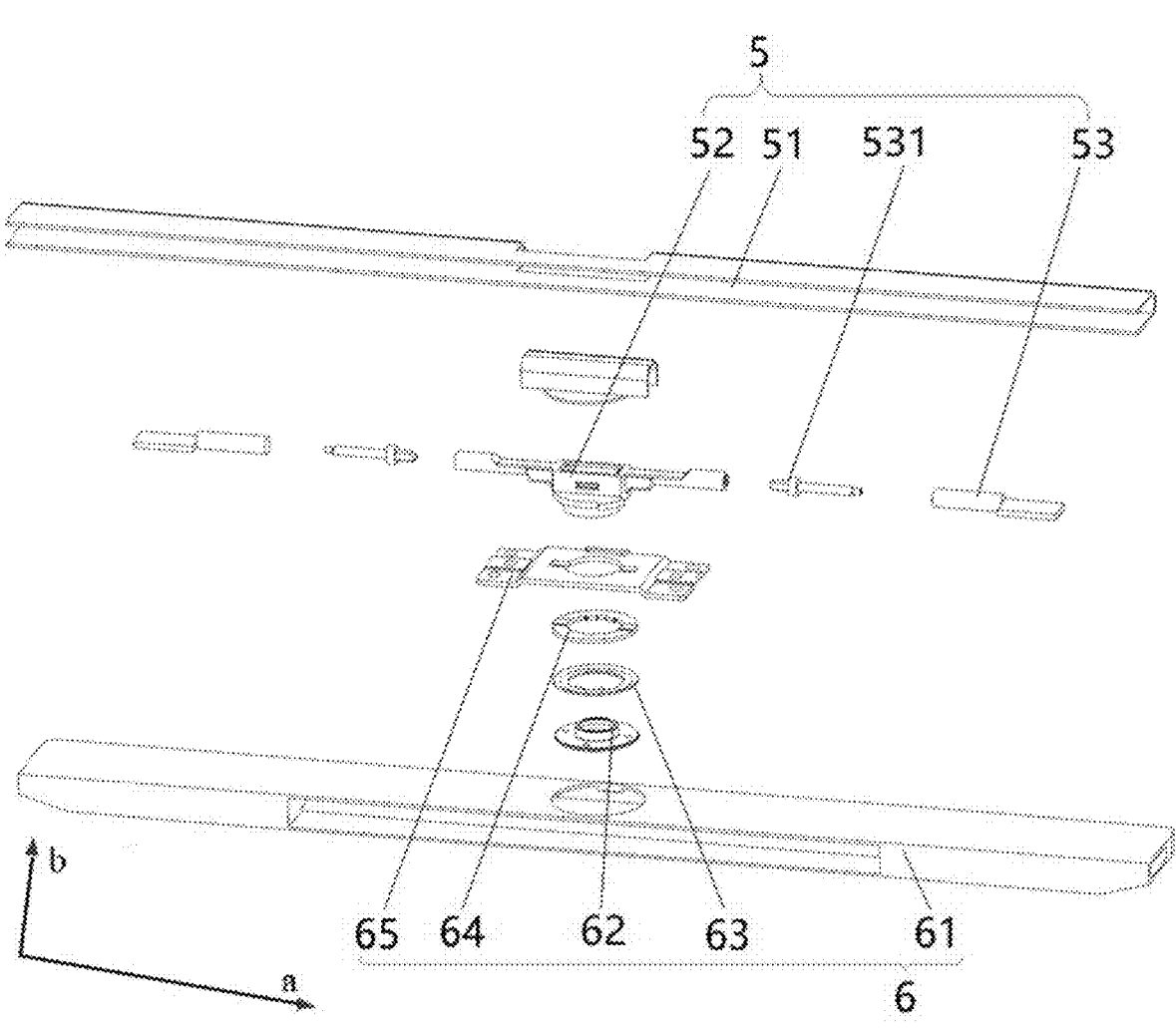
FIG. 6 illustrates a schematic exploded diagram showing a basic structure of a connection assembly according to some embodiments of the present disclosure.

As shown in FIG. 5 and FIG. 6, for the basic structure of the connection assembly 4, the first part 5 includes a U-shaped connection shell 51, a T-shaped axis body 52, and a flipping axis 53. Flipping axes 53 are rotatably arranged at two ends of the T-shaped axis body 52 along first direction A, respectively. The flipping axes 53 can be configured to be connected to the first body 2 and apply forces for performing flipping and rotation to implement the horizontal axis. The U-shaped connection shell 51 at least covers the flipping axes 53 to ensure a complete and aesthetical connection to the first body 2. First direction A is perpendicular to second direction B. That is, first direction A can be a direction parallel to a length or width of the first body 2 or the second body 3, i.e., the direction of the horizontal axis.

As shown in FIG. 5 and FIG. 6, for the basic structure of the connection assembly 4, the second part 6 includes a connection frame 61, a flange 62, a lower chuck 63, an upper chuck 64, and a base 65. The flange 62 and the base 65 are stacked along second direction B to allow the T-shaped axis body 52 to be fitted into a corresponding hole to arrange the vertical axis. The upper chuck 64 and the lower chuck 63 are stacked between the flange 62 and the base 65 to provide torsion for the rotation of the T-shaped axis body 52. The connection frame 61 at least accommodates the flange 62, the lower chuck 63, the upper chuck 64, and the base 65 to ensure a complete and aesthetical connection to the second body 3. Second direction B is the direction from the second body 3 to the first body 2 when the second body 3 and the first body 2 are stacked.

Based on the above, in the electronic device 1 of embodiments of the present disclosure, when the first body 2 moves relative to the second body 3 in the first motion mode to the position satisfying the first positional relationship with the second body 3 through the cooperation of the first part 5 and the second part 6 in the connection assembly 6, the movement in the second motion mode of the first body 2 relative to the second body 3 can be impacted. That is, the first body 2 cannot perform the movement in the second motion mode. Thus, the screen end can only perform the rotation of switching the display directions only after the screen end flips a certain angle relative to the system end. Therefore, the problem is that when the angle of the display in the existing laptop computer is relatively small, rotating the screen would cause misalignment with the base or the system end, which may lead to scratches on the screen.

In the present disclosure, the term "and/or" is merely used to describe the relationship between related objects and indicates the existence of three possible relationships, for example, A and/or B can include any of three situations such as both A and B, A alone, or B alone.

Furthermore, in electronic device 1 of embodiments of the present disclosure, the connection assembly 4 can include an impact member 7. The impact member 7 can include a first state and a second state. The first state can affect the movement in the first motion mode of the first body 2. The second state may not impact the movement in the second motion mode of the first body 2.

The electronic device 1 can include a control assembly 8 connected to the impact member 7. The control assembly 8 can be associated with the movement in the first motion mode of the first body 2 through the first part 5 and can be configured to control the impact member 7 to be in the first state when the first body 2 moves in the first motion mode through the first part 5 to the position satisfying the first position relationship with the second body 3. The control assembly 8 can be further configured to control the impact member 7 to be in the second state when the first body 2 moves in the second motion mode through the first part 5 to the position satisfying the second position relationship with the second body 3.

In some embodiments, to cause the connection assembly 4 to impact or not impact the movement in the second motion mode, the connection assembly 4 of embodiments of the present disclosure can include the control assembly 8 and the impact member 7. The impact member 7 can be a structure member arranged between and/or above the first part 5 and the second part 6. The impact member 7 can be controlled by the control assembly 8 to switch between the first state and the second state to impact or not impact the movement in the second motion mode of the first body 2. That is, before the first body 2 flips to the predetermined angle relative to the second body 3, i.e., 90°, the first body 2 and the second body 3 can be in the first position relationship. The impact member 7 can be controlled to be in the first state. After the first body 2 flips to the predetermined angle relative to the second body 3, i.e., 90°, the first body 2 and the second body 3 can be in the second position relationship. The impact member 7 can be controlled to be in the second state. For example, the impact member 7 can include a position-limiting member. The position-limiting member can move forth and back between the first part 5 and the second part 6 to limit the position. For another example, the impact member 7 can include position-limiting members cooperating with each other. The position-limiting members can move close to or away from each other to limit the position. The control assembly 8 can be a structure member or an electrical controller associated with the movement in the first motion mode of the first body 2 through the first part 5. That is, the control assembly 8 can obtain a degree of the movement in the first motion mode of the first body 2 to control the impact member 8. When the control assembly 8 is the structure member, the structure member can be arranged between the first part 5 and the second part 6, and the first motion mode of the first body 2 can be structural linkage movement. When the control assembly 8 is the electrical controller, the electrical controller can detect the degree of the movement in the first motion mode of the first body 2 and determine the first position relationship and the second position relationship according to the predetermined angle to control the impact member 7.

Further, in the electronic device 1 of embodiments of the present disclosure, the control assembly 8 can be the structure controller included in the connection assembly 4.

The impact member 7 can include a first structure member 71 and a second structure member 72 that cooperate with each other. The first state can include that the first structure member 71 and the second structure member 72 satisfy a limiting relationship. The second state can include that the first structure member 71 and the second structure member 72 do not satisfy the limiting relationship.

In some embodiments, the structure controller can move with the movement in the first motion mode of the first body 2 through the first part 5. Moreover, the structure controller can be connected to the first structure member 71.

If the first body 2 moves in the first motion mode through the first part 5 to the position satisfying the first position relationship with the second body 3, the structure controller can drive the first structure member 71 to cause the first structure member 71 and the second structure member 72 to satisfy the limiting relationship.

If the first body 2 moves in the first motion mode through the first part 5 to the position satisfying the second position relationship with the second body 3, the structure controller can drive the first structure member 71 to cause the first structure member 71 and the second structure member 72 to not satisfy the limiting relationship.

In some embodiments, when the control assembly 8 is the structure controller, the control assembly 8 can be connected to the first structure member 71 and the first body 2 to realize the structural linkage. When the first body 2 moves in the first motion mode, the structure controller can move accordingly to control the first structure member 71 and the second structure member 72. The structure controller can be connected to the above flipping axis 53 and/or the U-shaped connection shell 51 to obtain the degree of the movement in the first motion mode of the first body 2 and perform corresponding linkage movement. One of the first structure member 71 and the second structure member 72 can remain unmoved in the first part 5 or the second part 6, the other one of the first structure member 71 and the second structure member 72 can move relative to the unmoved one to limit the position and release the position limitation, for example, the cooperation between the position-limiting member and the position-limiting slot.

Furthermore, in the electronic device 1 of the present disclosure, the first structure member 71 can be movably arranged between the first part 5 and the second part 6 along second direction B. The second structure member 72 can be arranged at the second part 6 and movably cooperate with the first structure member 71.

In some embodiments, when the first body 2 moves through the first part 5 in the first motion mode to the position satisfying the first position relationship with the second body 3, the structure controller can drive the first structure member 71 to move along second direction B to a position in contact with the second structure member 72 to satisfy the limitation relationship. When the first body 2 moves through the first part 5 in the first motion mode to the position satisfying the second position relationship with the second body 3, the structure controller can drive the first structure member 71 to move along second direction B to a position away from the second structure member 72 to not satisfy the limitation relationship.

In some embodiments, to achieve the cooperative limitation of the first structure member 71 and the second structure member 72 along second direction B, embodiments of the present disclosure provide the following three technical solutions.

Figure 7:
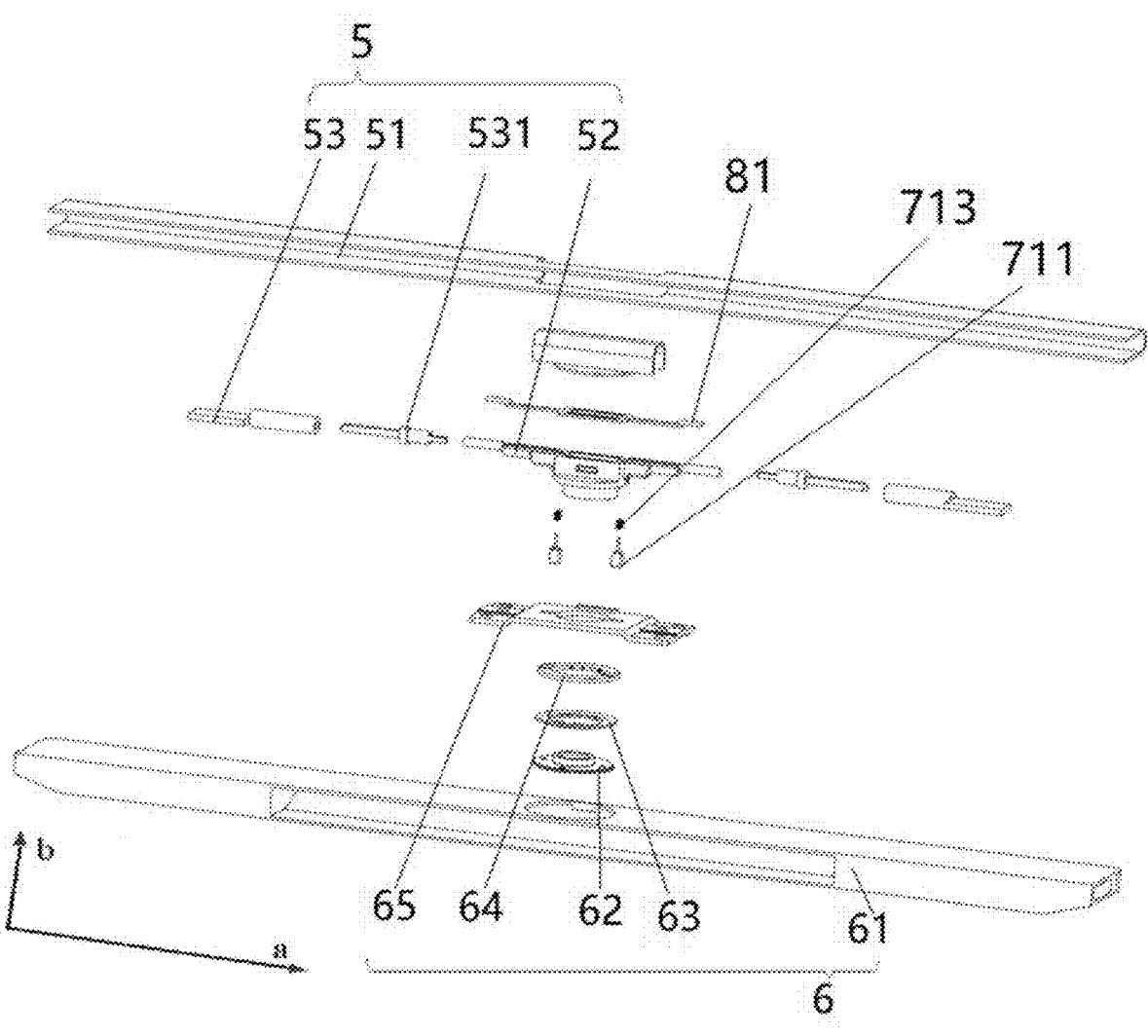
FIG. 7 illustrates a schematic diagram showing a first exploded structure of a connection assembly according to some embodiments of the present disclosure.
Figure 8:
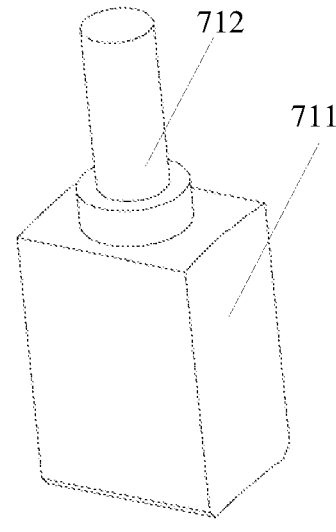
FIG. 8 illustrates a schematic structural diagram of a limiting member in FIG. 7.

As shown in FIG. 7 and FIG. 8, the second structure member 72 includes two position-limiting slots 66 spaced along first direction A on the base 65. A slot opening faces the first part 5. The first structure member 71 includes at least one position-limiting member 711 corresponding to the position-limiting slot 66, a connection rod 712, and an elastic member 713. The limiting member 711 is connected to the connection rod 712 upward along the second direction B, and the link 712 extends toward the first part 5 along the second direction B. The elastic member 713 is sleeved outside the connection rod 712. Two ends of the elastic member 713 abut against the position-limiting member 711 and the T-shaped axis body 52. A bottom side of the position-limiting member 711 can be chamfered to reduce friction when the position-limiting member 711 exits from or enters the position-limiting slot 66.

Figure 9:
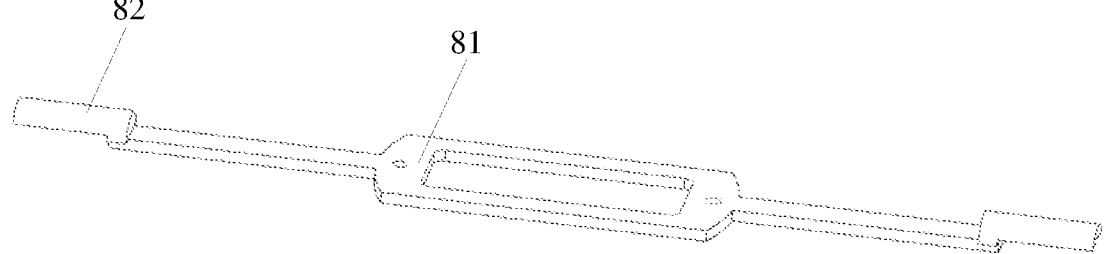
FIG. 9 illustrates a schematic structural diagram of a switch rod in FIG. 7.
Figure 10:
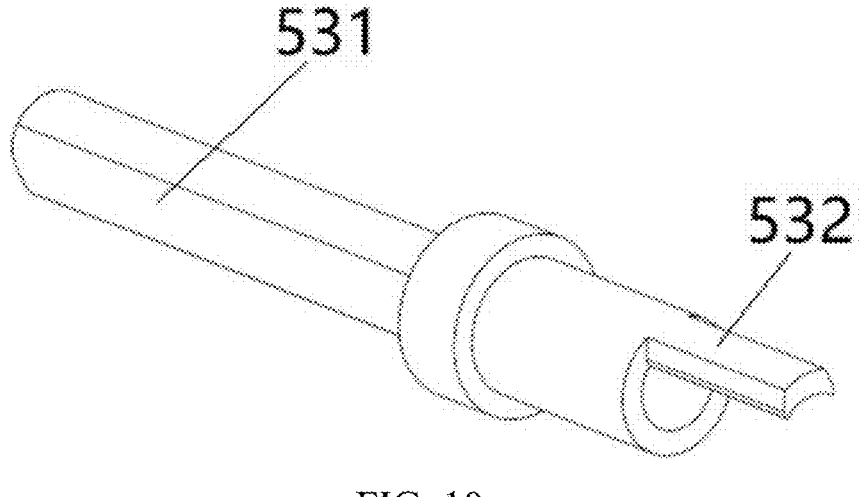
FIG. 10 illustrates a schematic structural diagram of a shaft center of a rotation shaft in FIG. 7.
Figure 11:
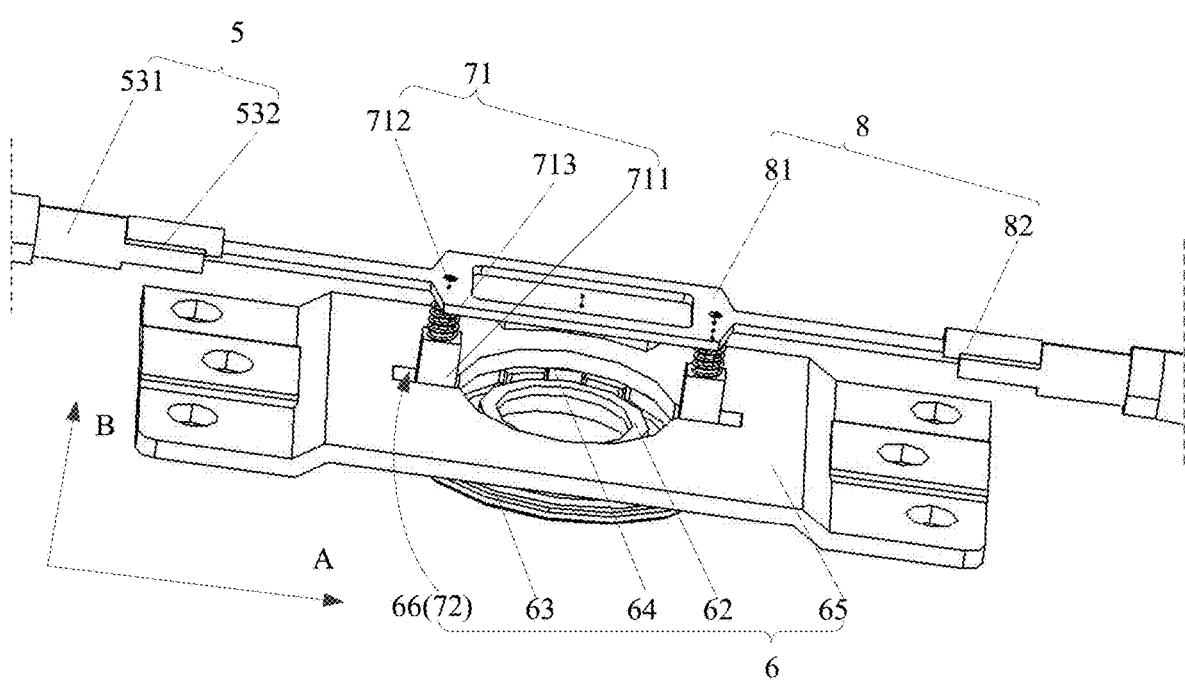
FIG. 11 illustrates a schematic structural diagram of a connection assembly in FIG. 7 in a position-limiting state.
Figure 12:
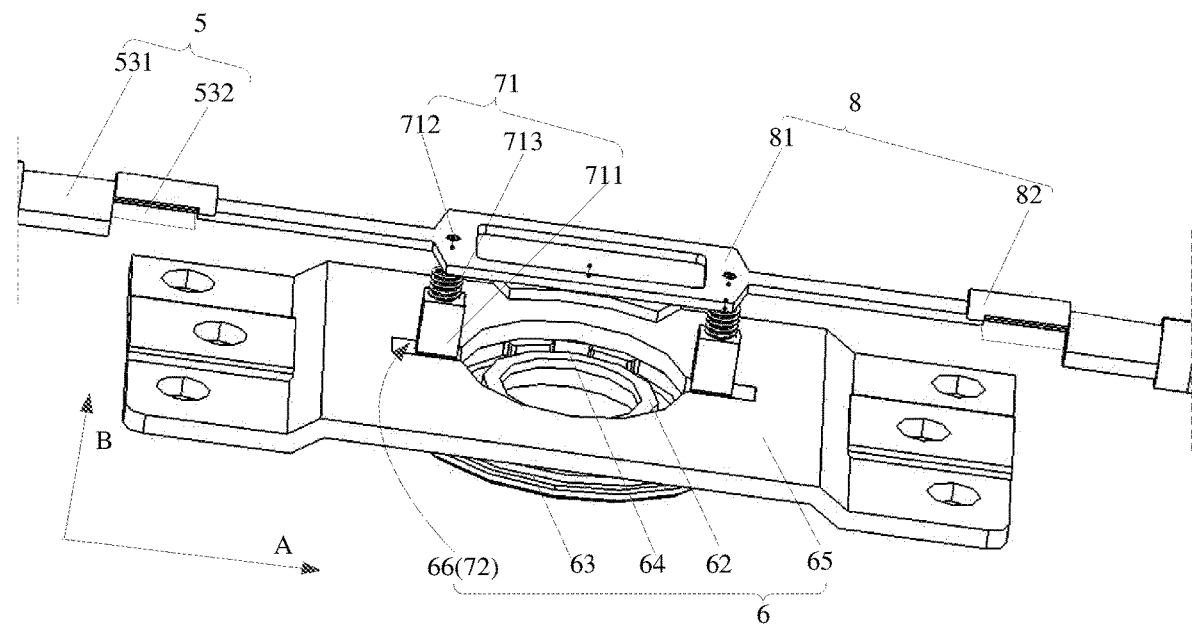
FIG. 12 illustrates a schematic structural diagram of the connection assembly in FIG. 7 in a non-position-limiting state.

As shown in FIG. 9 and FIG. 10, the control assembly 8 includes a switch member 81. The switch member 81 is arranged on a side of the T-shaped axis body 52 away from the base 65 and fixedly connected to the connection rod 712. In some embodiments, the connection rod 712 passes through the T-shaped axis body 52 and is fixedly connected to the switch member 81. First arc members 82 are arranged at two ends of the switch member 81 along first direction A on a side away from the base 65. An axis center 531 is arranged along first direction A at a corresponding flipping axis 53. A second arc member 532 is arranged on an end of the axis center 531 facing the T-shaped axis body 52 and matching the axis center 531. As shown in FIG. 11, in an initial state, the first body 2 is stacked relative to the second body 3. The position-limiting member 711 is in the position-limiting slot 66. The first body 2 can start to move in the first motion mode, i.e., flip around the horizontal axis with the axis center 531. Then, the position-limiting member 711 cannot disengage from the position-limiting slot 66. That is, the first body 2 and the second body 3 can be in the first position relationship to cause the first body 2 to only flip around the horizontal axis and not rotate around the vertical axis. Before the first body 2 flips around the horizontal axis relative to the second body 3 to the predetermined angle, e.g., 90°, the second arc member 532 may not be in contact with the first arc member 82, and the position-limiting member 711 can be still limited in the position-limiting slot 66. Correspondingly, as shown in FIG. 12, when the first body 2 flips to the determined angle, e.g., 90°, the second arc member 82 is stacked with the first arc member 532 along second direction B to further lift the first arc member 532, i.e., switch member 81, along second direction B upwards. Thus, the position-limiting member 711 can be pulled up and out of the position-limiting slot 66 through the connection rod 712. Thus, the position-limiting member 711 can be disengaged from the position-limiting slot 66. Then, the first body 2 can move in the second motion mode relative to the second body 3. That is, the rotation around the vertical axis may not be impacted. That is, the first body 2 and the second body 3 are in the second position relationship. After the position-limiting member 711 is disengaged from the position-limiting slot 66, the position-limiting member 711 can rotate with the first part 5 and the first body 2. The position-limiting member 711 can remain above the base 65 during the rotation. The elastic member 413 can always provide an elastic force facing downward until the first body 2 moves 180° in the second motion mode. That is, the display is flipped forward and backward. Then, the position-limiting member 711 is corresponding to the other position-limiting slot 66. The position-limiting member 711 can return to the position-limiting slot 66 under the elastic force to realize a second lock. That is, the movement of the second motion mode can be limited again. The initial positions of the first arc member 82 and the second arc member 532 can be set as needed to adjust the first position relationship, i.e., the predetermined angle. For example, before the first body 2 flips to 90°, 45°, 60°, etc., relative to the second body 3, the first body 2 can have the first position relationship with the second body 3. Correspondingly, the position-limiting member 711 can be adjusted for a lifting distance along second direction B. The position-limiting member 711 of embodiments of the present disclosure can be a rigid structure, which cannot be compressed. Then, after the first body 2 reaches the predetermined angle and moves a certain degree in the second motion mode, i.e., rotates for a certain range (not reach the second lock state), the first body 2 cannot perform the movement in the first motion mode. Thus, in some embodiments, two position-limiting members 711 can be provided corresponding to the position-limiting slots 66 to ensure the first body 2 to move stably.

Figure 13:
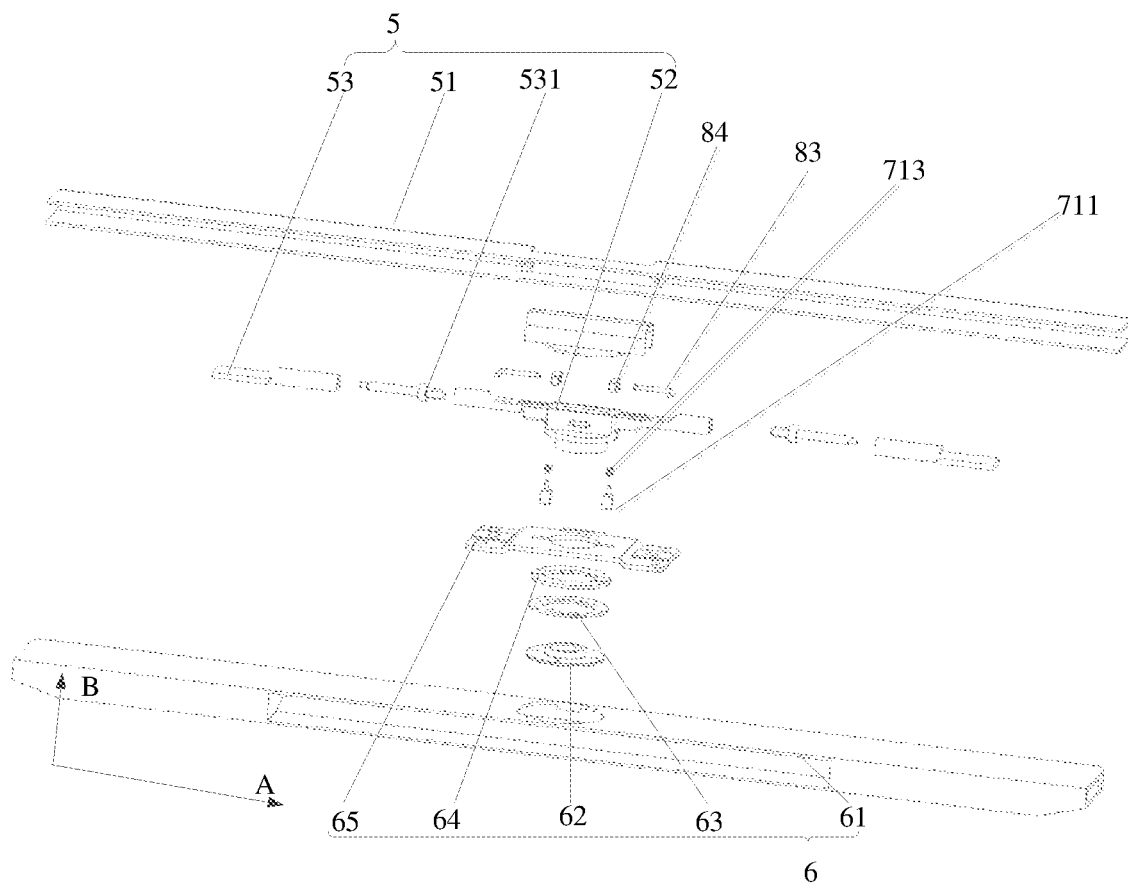
FIG. 13 illustrates a schematic diagram showing a second exploded structure of a connection assembly according to some embodiments of the present disclosure.
Figure 14:
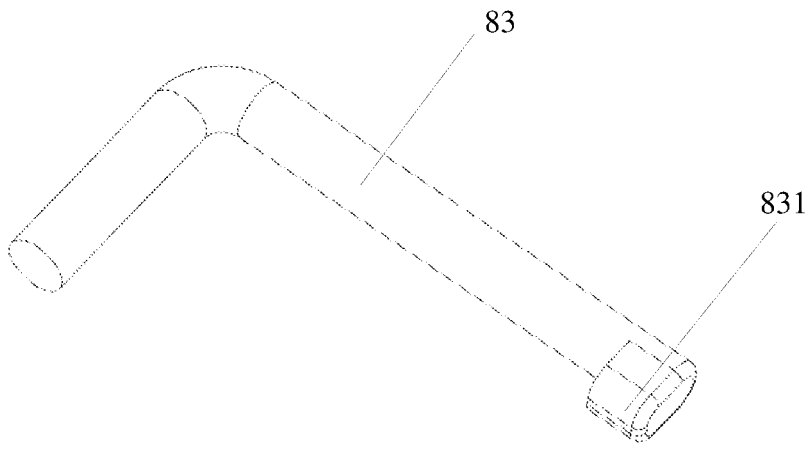
FIG. 14 illustrates a schematic structural diagram of a switch rod in FIG. 13.
Figure 15:
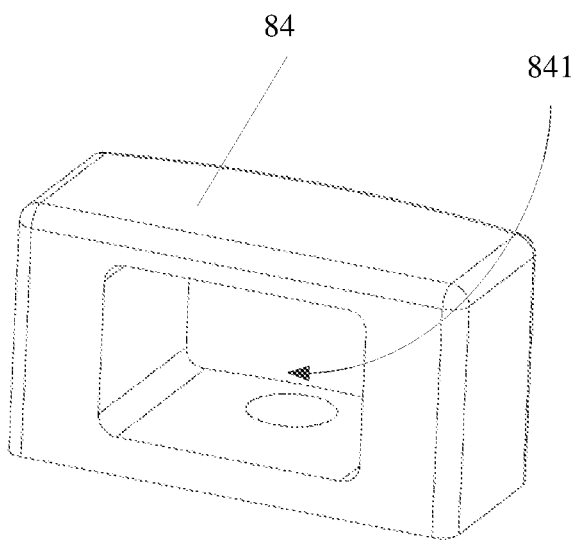
FIG. 15 illustrates a schematic structural diagram of a top member in FIG. 13.

In some other embodiments, as shown in FIGS. 13 to 15, the second structure member 72 includes two position-limiting slots 66 at the base 65 spaced apart along first direction A. The slot opening of the position-limiting slot 66 faces the first part 5. The first structure member 71 includes at least one position-limiting member 711, a connection rod 712, and an elastic member 713. The position-limiting member 711 is connected to the connection rod 712 along second direction B, and the connection rod 712 extends along second direction B toward the first part 5. The elastic member 713 is sleeved at the outside of the connection rod 712. The two ends of the elastic member 713 abuts against the position-limiting member 711 and the T-shaped axis body 52. The side edge of the position-limiting member 711 can be chamfered to reduce the friction when the position-limiting member 711 is disengaged from or enters the position-limiting slot 66.

Figure 16:
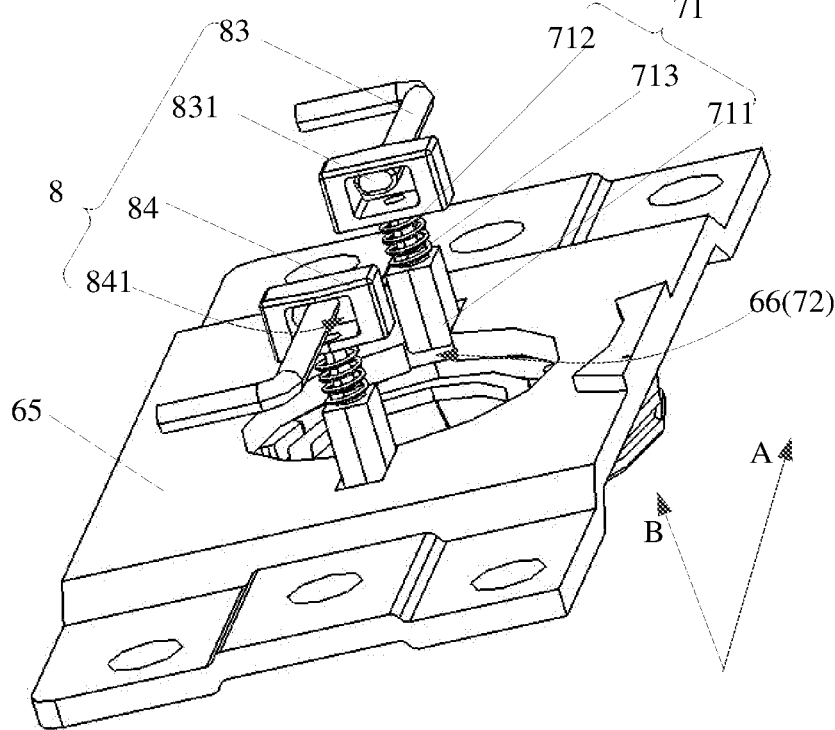
FIG. 16 illustrates a schematic structural diagram of a connection assembly in FIG. 13 in a position-limiting state.
Figure 17:
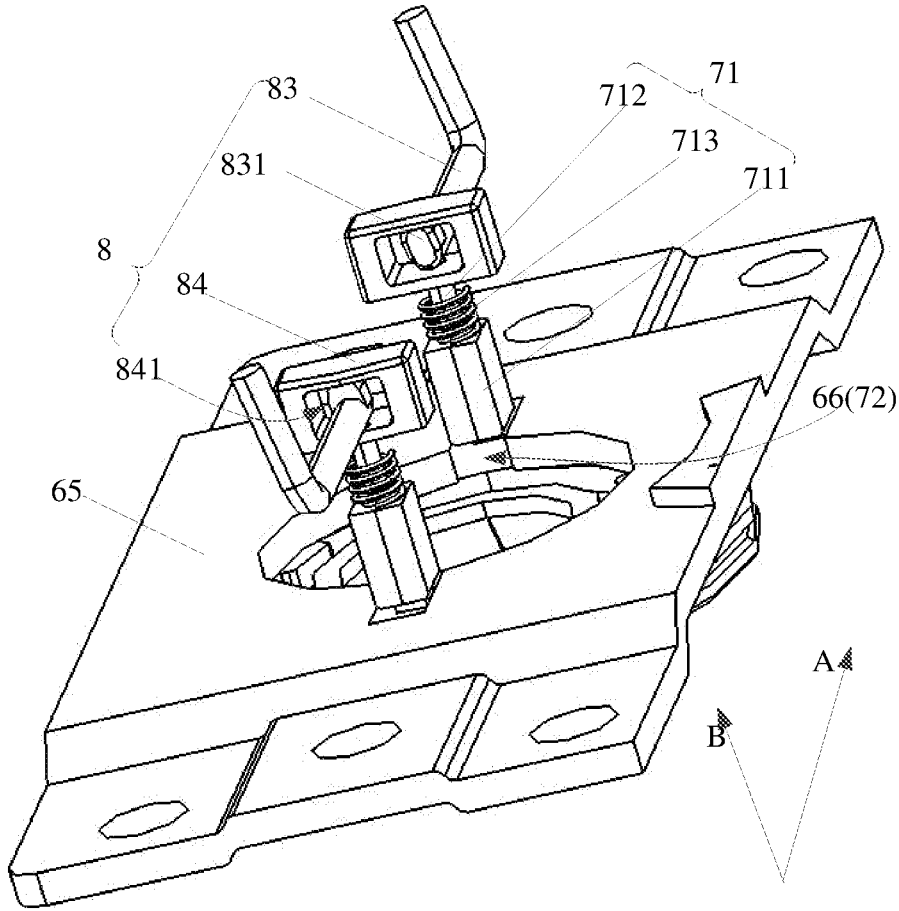
FIG. 17 illustrates a schematic structural diagram of the connection assembly in FIG. 13 in a non-position-limiting state.

Thus, as shown in FIG. 14 and FIG. 15, the control assembly 8 includes two switch rods 83 and two top members 84. The two switch rods 83 are arranged corresponding to two axis centers 531, respectively. The axial center 531 does not have a special structure, as long as the axis center 531 is coaxial with the flipping axis 53. The switch rod 83 can be connected to the axis center 531 or the U-shaped connection shell 51, as long as the switch rod 83 can flip around the horizontal axis with the first body 2. An end of the switch rod 83 away from the axis center 531 can be a switch head in an oval shape or racetrack shape and can be eccentrically arranged from the axis center 531. The top member 84 can be a groove-shaped top member. A side surface of the top member 84 includes an accommodation groove 841, which s configured to accommodate and be connected to the switch head 831 of the switch rod 83. The connection rod 712 can pass through the T-shaped axis body 52 along second direction B and can be fixedly connected to the top member 84. As shown in FIG. 16, in the initial state, the first body 2 is stacked relative to the second body 3. The position-limiting member 711 is in the position-limiting slot 66. The first body 2 and the second body 3 can be in the first position relationship. The first body 2 can start to move in the first motion mode. That is, when the first body 2 flips around the horizontal axis with the axis center 531, the position-limiting member 711 cannot be disengaged from the position-limiting slot 66. Thus, the first body 2 can only flip around the horizontal axis but cannot rotate around the vertical axis. In the process, before the first body 2 flips around the horizontal axis to the predetermined angle relative to the second body 3, i.e., 90°, the size of the switch head 831 along second direction B can be relatively small. The position-limiting member 711 can be still partially limited in the position-limiting slot 66. Accordingly, as shown in FIG. 17, when the first body 2 flips to the determined angle, e.g., 90°, the size of the switch head 831 along second direction B can become big after the switch head 831 flips with the axis center 531 or the first body 2 flips to lift the top member 84 along second direction B upwardly. Thus, the position-limiting member 711 can be pulled up and pulled out of the position-limiting slot 66 through the connection rod 712. Then, the position-limiting member 711 can be disengaged from the position-limiting slot 66. Then, the movement in the second motion mode of the first body 2 relative to the second body 3, i.e., the rotation around the vertical axis, may no longer be impacted. That is, the first body 2 and the second body 3 can be in the second position relationship. After the position-limiting member 711 is disengaged from the position-limiting slot 66, the position-limiting member 711 can rotate with the first part and the first body 2. The position-limiting slot 66 can remain above the base 65 during rotation. The elastic member 413 can always provide an elastic force downward, until the first body 2 moves 180° in the second motion mode, i.e., the display flips back and forth. Then, the position-limiting member 711 can correspond to the other position-limiting slot 66. The position-limiting member 711 can return to the position-limiting slot 66 to realize the second lock. That is, the movement in the second motion mode can be limited again. The initial positions of the switch head 831 and the accommodation groove 841 of the top member 84 can be arranged as needed to adjust the first position relationship, i.e., the predetermined angle. For example, before the first body 2 flips to 90°, 45°, 60°, etc., relative to the second body 3, the first body 3 can satisfy the first position relationship with the second body 3. Meanwhile, the corresponding size of the switch head 831 can be adjusted. The position-limiting member 711 of embodiments of the present disclosure can be a rigid structure, which cannot be compressed. Thus, after the first body 2 reaches the predetermined angle, and moves a certain degree in the second motion mode, i.e., rotates in a certain range (not reach the second lock state), the first body 2 can no longer move in the first motion mode. In some embodiments, two position-limiting members 711 corresponding to the position-limiting slots 66 can be arranged to ensure the first body to move stably.

Figure 18:
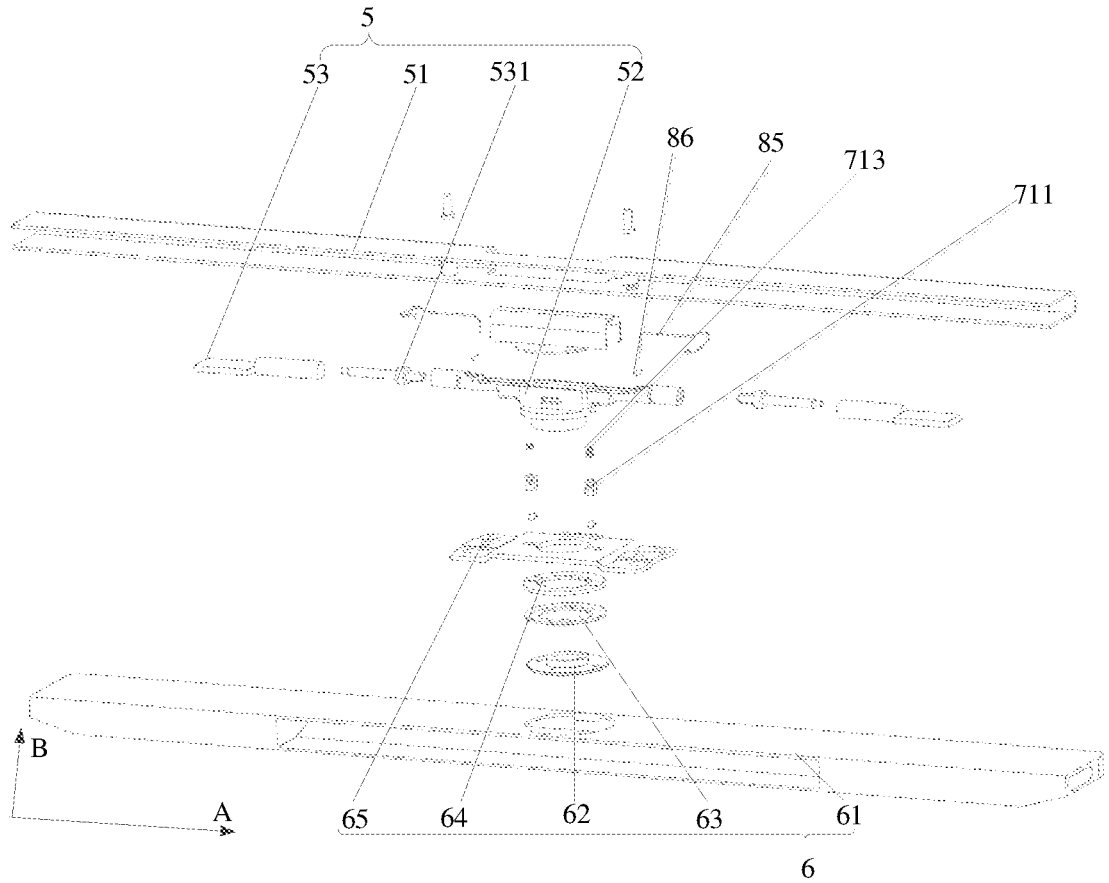
FIG. 18 illustrates a schematic diagram showing a third exploded structure of a connection assembly according to some embodiments of the present disclosure.
Figure 19:
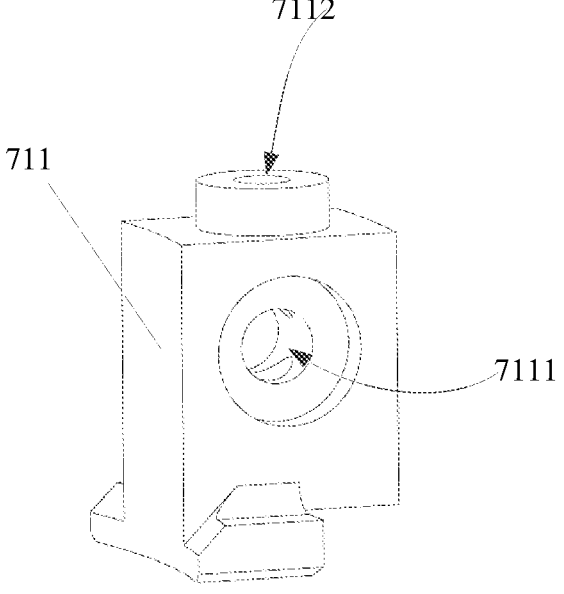
FIG. 19 illustrates a schematic structural diagram of a position-limiting member in FIG. 18.

In some other embodiments, as shown in FIG. 18 and FIG. 19, the second structure member 72 includes two position-limiting slots 66 spaced apart along first direction A at the base 65. The slot opening faces the first part 5. The first structure member 71 includes two position-limiting members 711 corresponding to the position-limiting slots 66 and an elastic member 713. A horizontal first through-hole 7111 is arranged in the position-limiting member 711 and is configured to allow a rod or a screw to pass through. An end of the position-limiting member 711 away from the base 65 includes a second through-hole 7112 communicating with and perpendicular to the first through-hole 71111. The second through-hole 7112 can be configured to allow a rope body 85 to pass through. The elastic member 713 can be arranged at an end of the position-limiting member 711 away from the base 65 and can be configured to be sleeved at the outside of the rope body 85. The two ends of the elastic member 713 abuts against the position-limiting member 711 and the T-shape axis body 52. A bottom edge of the position-limiting member 711 can be chamfered to reduce the friction when the position-limiting member 711 is disengaged from and enters into the position-limiting slot 66.

Figure 20:
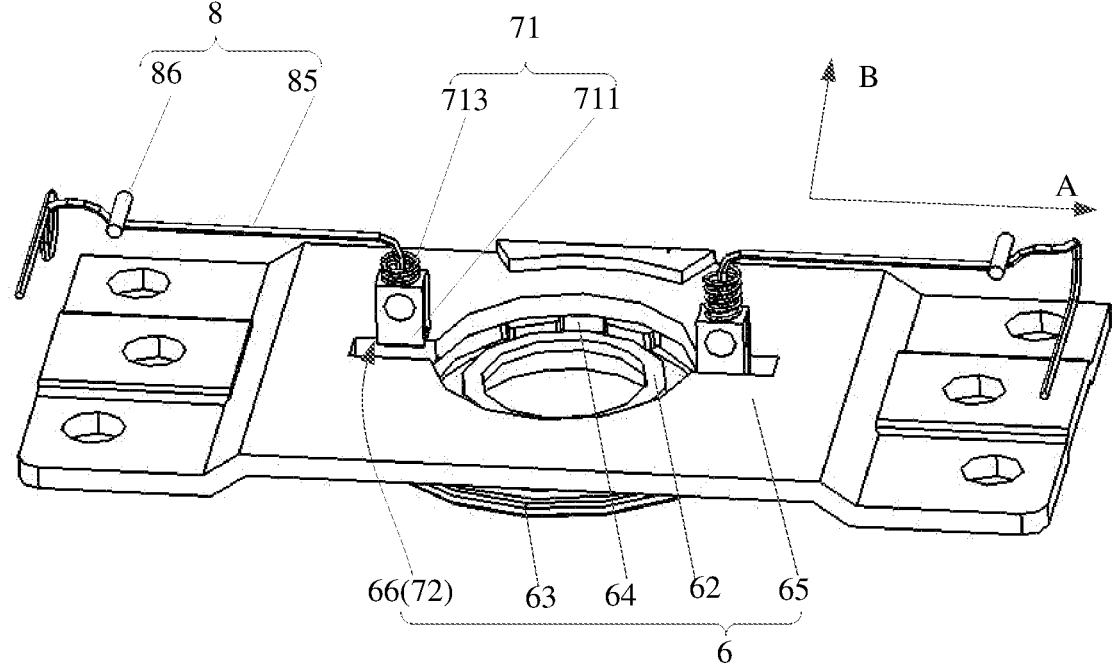
FIG. 20 illustrates a schematic structural diagram of a connection assembly in FIG. 18 in a position-limiting state.
Figure 21:
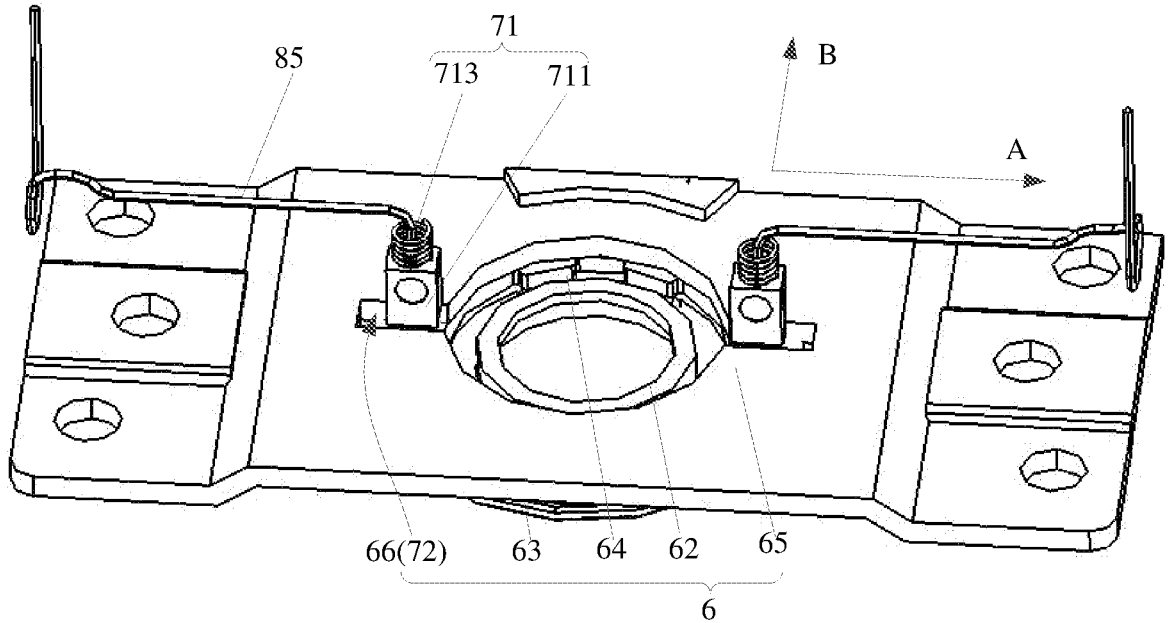
FIG. 21 illustrates a schematic structural diagram of the connection assembly in FIG. 18 in a non-position-limiting state.

Thus, as shown in FIG. 18, the control assembly 8 includes two equal length rope bodies 85 and two compression wheels 86. The two rope bodies 85 are arranged corresponding to the two axis centers 531 along first direction A, respectively. Thus, the axis center 531 does not have a special structure, as long as the axis center 531 can be coaxial with the flipping axis 53. An end of the rope body 85 can be connected to the axis center 531 or the U-shaped connection shell 51, as long as the end of the rope shape 85 can flip with the first body 2 to be winded. The other end of the rope body 85 can pass through the T-shaped axis body 52, the elastic member 712, and the second through-hole 7112 to be connected to the rod body or screw in the first through-hole 7111. Thus, the other end of the rope body 85 can be fixedly connected to the position-limiting member 711. Winding directions of the two rope bodies 85 in the initial state can be opposite to each other. When the rope bodies 85 flip with the first body 2, one of the rope bodies 85 can get loose, and the other one of the rope bodies 85 can get tight. Further, as shown in FIG. 20, in the initial state, the first body 2 is stacked relative to the second body 3. One position-limiting member 711 is in the position-limiting slot 66, and the other position-limiting member 711 is outside the position-limiting slot 66. One of the corresponding elastic members 712 does not deform, and the other one of the corresponding elastic members 712 is compressed. Thus, the position-limiting member 711 cannot be disengaged from the position-limiting slot 66 to cause the first body 2 to only flip around the horizontal axis and not rotate around the vertical axis. Before the first body 2 flips to the predetermined angle around the horizontal axis relative to the second body 3, e.g., 90°, the position-limiting member 711 can still be partially limited in the position-limiting slot 66. Accordingly, as shown in FIG. 21, when the first body 2 continues to flip, and the two rope bodies 85 flip with the first body 2, the rope body 85 that gets loose corresponding to the position-limiting member 711 outside the position-limiting slot 66 can relax and move toward the position-limiting slot 66 when the elastic member 712 restores a deformation force. Correspondingly, the position-limiting member 711 in the position-limiting slot 66 can be pulled by the rope body 85 that gets tight to move toward the position-limiting slot 66 along second direction B. That is, the two position-limiting members 711 can ascend and descend alternatively along second direction B and a reverse direction of second direction B. When the first body 2 flips to the predetermined angle, e.g., 90°, the two position-limiting members 711 can be outside the position-limiting slots 66. Then, the first body 2 can move in the second motion mode relative to the second body 3. That is, the rotation around the vertical axis may no longer be impacted. After the position-limiting member 711 is disengaged from position-limiting slot 66, the position-limiting member 711 can rotate with the first part 5 and the first body 2. During the rotation, the position-limiting member 711 can always remain above base 65. The elastic member 413 can always provide an elastic force downward that is the same as the pulling force of the rope body 85. The length of the rope that can be wounded can be associated with the overlap degree of the rope body 85 with the position-limiting member 711 and the position-limiting slot along second direction B. By adjusting the data above, the first position relationship can be adjusted as needed, i.e., the predetermined angle. For example, before the first body 2 flips to 90°, 45°, 60°, etc., relative to the second body 3, the first body 2 always is in the first position relationship with the second body 3. After the first body 2 reaches the predetermined angle, the first body 2 can move a certain degree in the second motion mode, that is rotation for a certain range, i.e., after the first body 2 rotates a certain range. The first body 2 can continue to move in the first motion mode. A soft rope of the rope body 85 cannot be stretched long, e.g., wire rope. To ensure that rope body 85 does not shift or move. The compression wheel 86 is arranged. The compression wheel 65 can be arranged on a side of the rope body 85 away from the base 85 along third direction C (a direction perpendicular to first direction A and second direction B) to compress and position. The compression wheel 86 can be directly connected to or rotatably connected to the U-shaped connection shell 51 or the T-shaped axis body 52.

Figure 22:
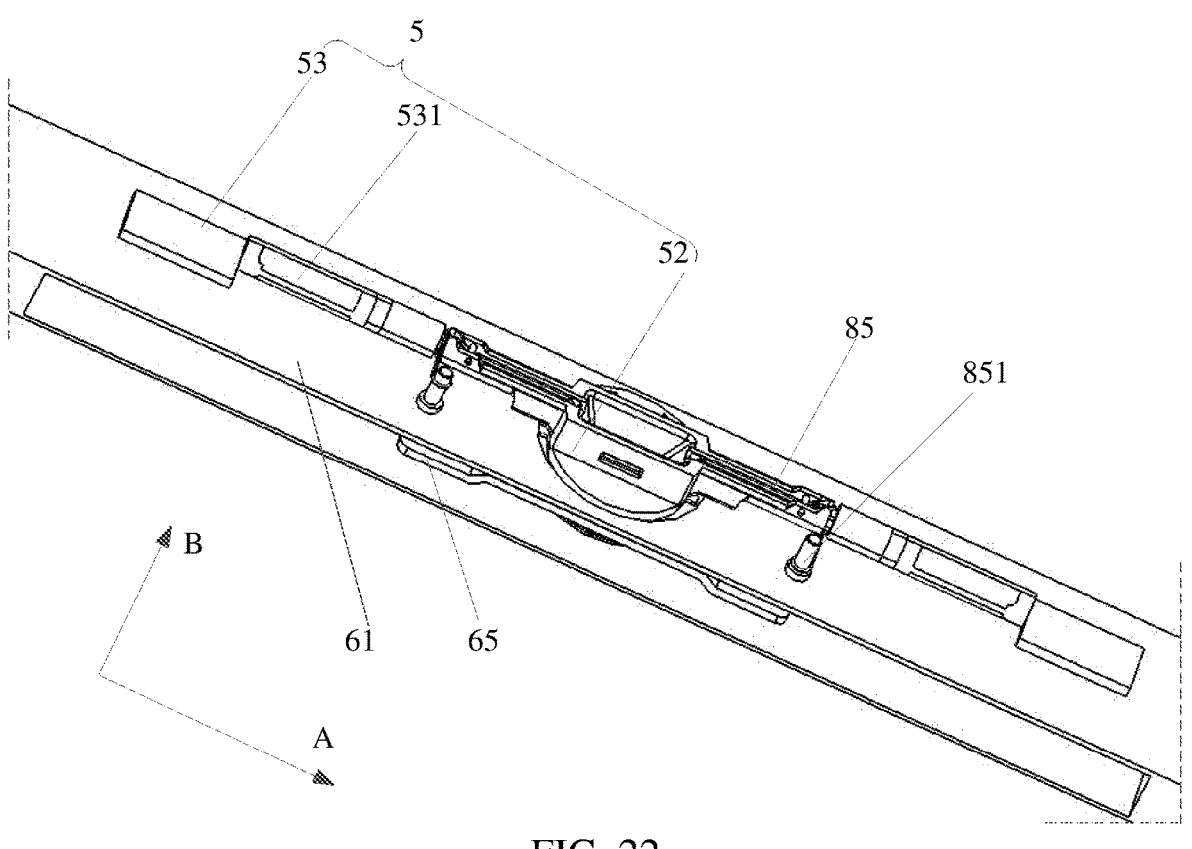
FIG. 22 illustrates a schematic diagram showing structural cooperation between a rope body and the connection assembly in FIG. 18.

Moreover, to realize humanized adjustment, as shown in FIG. 22, in some embodiments, one end of the rope body 85 connected to the axis center 531 or the first body 2 is arranged in the space of the U-shaped connection shell 51 or outside the electronic device 1, and an adjustment end 851 is preserved, such as a rotatable screw. Thus, the winding length of the rope body 85 can be adjusted, thereby adjusting as needed the first position relationship between the first body 2 and the second body 3 to improve the flexibility of the electronic device 1 and cause the electronic device 1 to be more suitable for humans.

Further, in the electronic device 1 of embodiments of the present disclosure, the first structure member 5 can be movably arranged between the first part 5 and the second part 6 along first direction A. First direction A can be perpendicular to a stacking direction of the first body 2 and the second body 3. The second structure member 72 can be arranged at the second part 6 and movably cooperate with the first structure member 71.

The first body 2 can move in the first motion mode to a position satisfying the first positional relationship with the second body 3 through the first part 5. The structure controller can drive the first structure member 71 to move along first direction A to be snapped with the second structure member 72 to satisfy the limitation relationship. The first body 2 can move in the first motion mode to a position satisfying the second position relationship with the second body 3 through the first part 5. The structure controller can drive the first structure member 71 to move along first direction A to be independent of the second structure member 72 to not satisfy the limitation relationship.

In some embodiments, to realize the cooperative position limitation of the first structure member 71 and the second structure member 72 in first direction A, embodiments of the present disclosure provide two technical solutions below.

Figure 23:
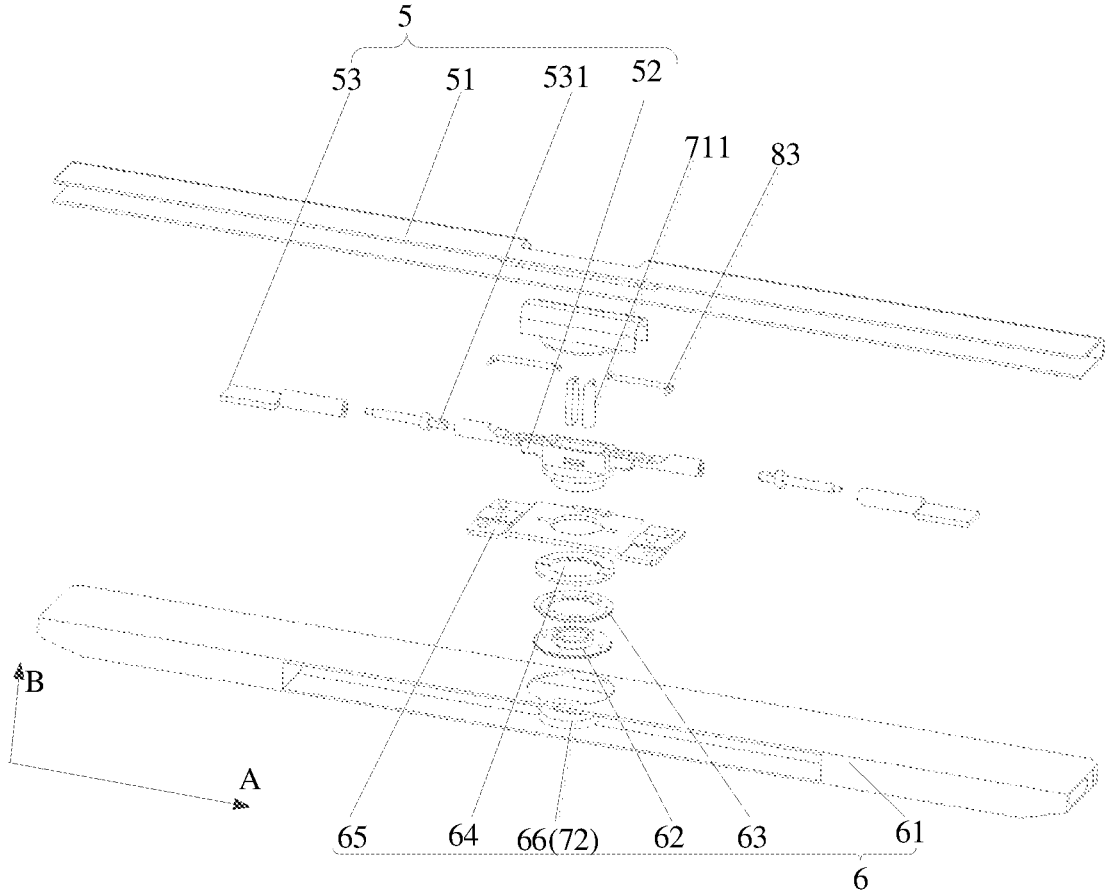
FIG. 23 illustrates a schematic diagram showing a fourth exploded structure of a connection assembly according to some embodiments of the present disclosure.

In some embodiments, as shown in FIG. 23, the first structure member 71 includes two position-limiting members 711. The two position-limiting members 711 are arranged to face each other along first direction A. The second structure member 72 includes a position-limiting slot 66 arranged along first direction A. The two position-limiting members 711 can move close to or away from each other in the position-limiting slot 72 along first direction A.

The first body 2 can move in the first motion mode to a position satisfying the first position relationship with the second body 3 through the first part 5. The structure controller can drive the two position-limiting members 711 to move close to each other along first direction A to a first determined distance to satisfy the limitation relationship. The first body 2 can move in the first motion mode to a position satisfying the first position relationship with the second body 3 through the first part 5. The structure controller can drive the two position-limiting members 711 to move away from each other along first direction A to a second determined distance to not satisfy the limitation relationship.

Figure 24:
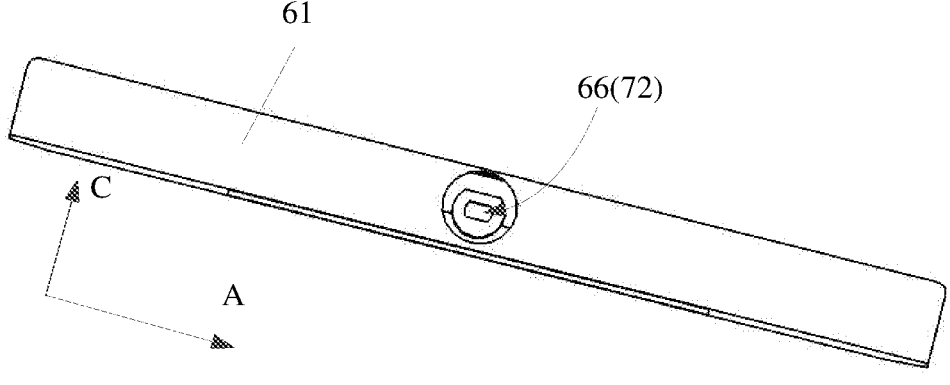
FIG. 24 illustrates a schematic structural diagram of a second structure member in a connection assembly in FIG. 23.
Figure 25:
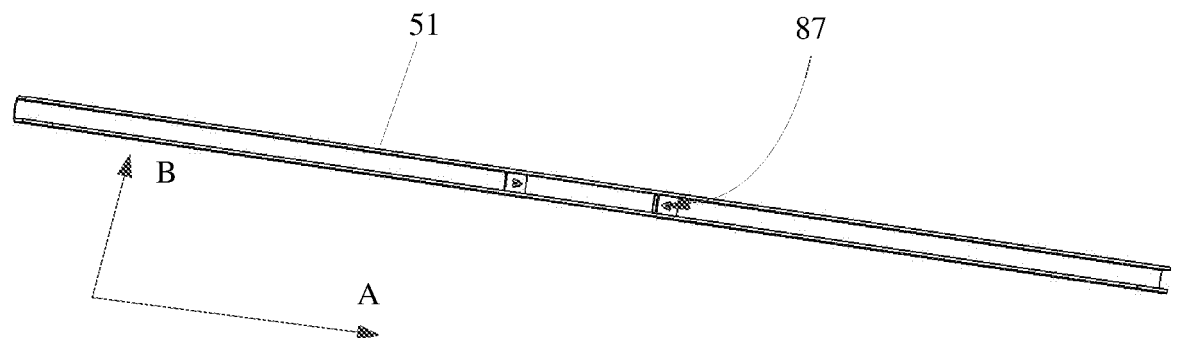
FIG. 25 illustrates a schematic structural diagram of a direction guide groove in the connection assembly in FIG. 23.
Figure 26:
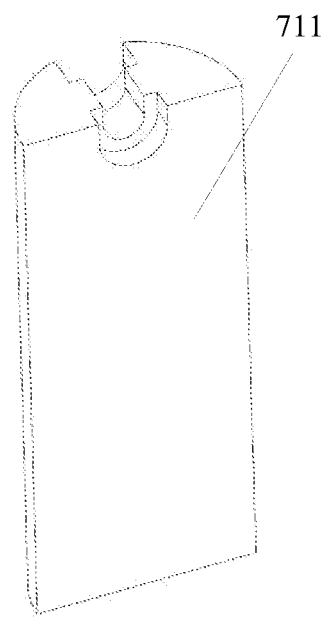
FIG. 26 illustrates a schematic structural diagram of a position-limiting member in FIG. 23.
Figure 27:
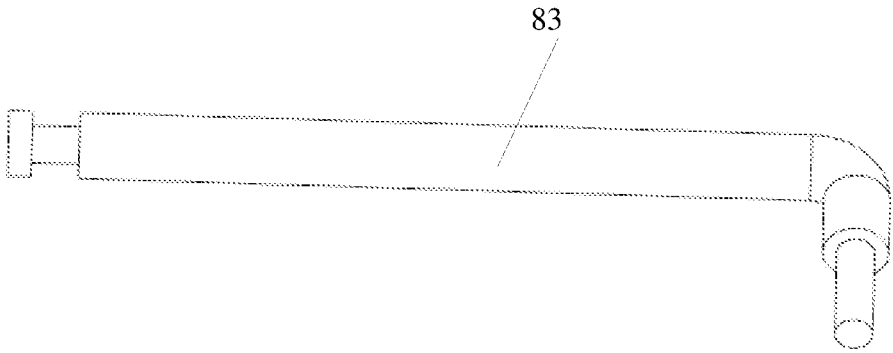
FIG. 27 illustrates a schematic structural diagram of a switch rod in FIG. 23.
Figure 28:
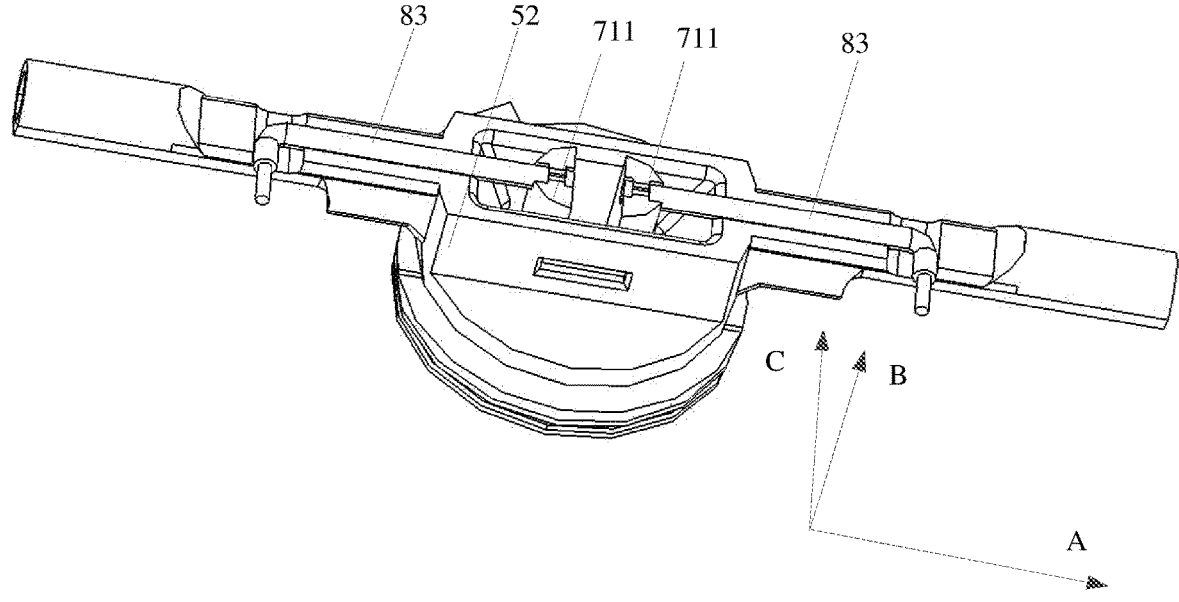
FIG. 28 illustrates a schematic structural diagram of a connection assembly in FIG. 13 in a non-position-limiting state.
Figure 29:
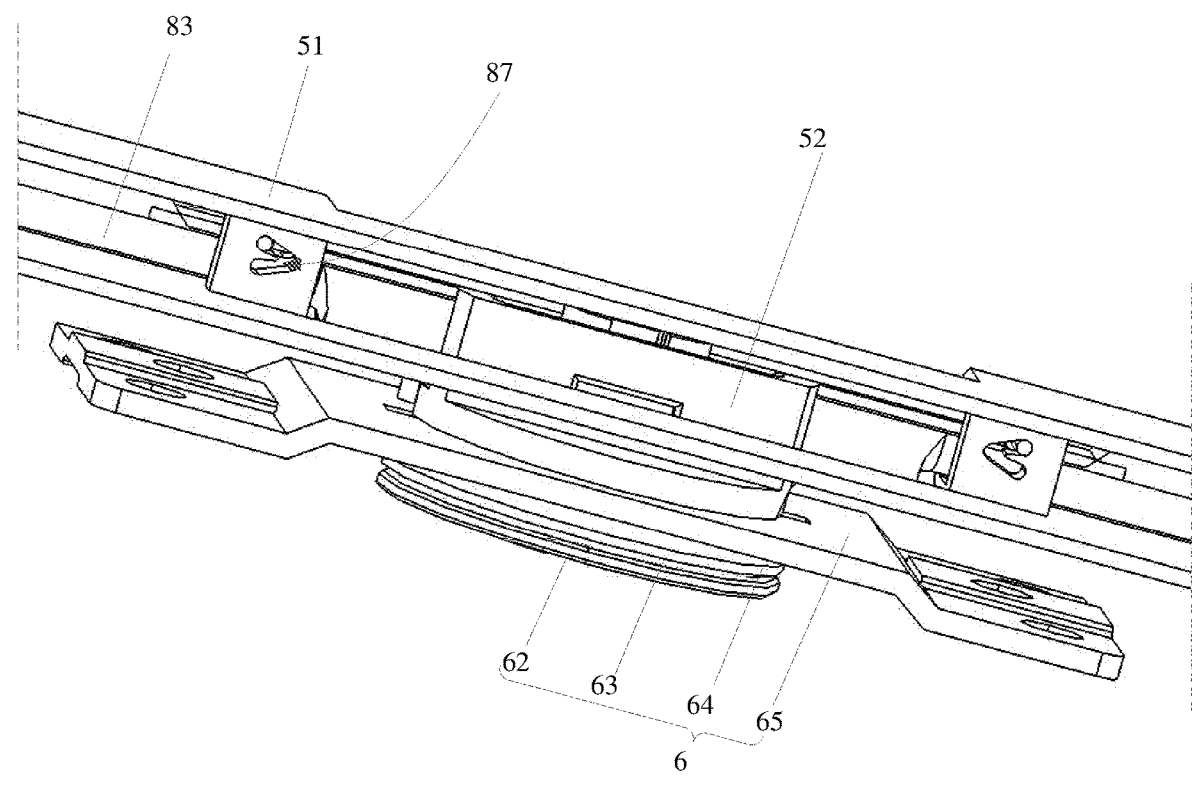
FIG. 29 illustrates a schematic diagram showing structural cooperation between the switch rod and the direction guide groove in the state of FIG. 28.

In some embodiments, as shown in FIG. 23 and FIG. 24, the position-limiting slot 66 is arranged at the bottom of the connection frame 61. The size of the position-limiting slot 66 can be greater than or equal to an outer diameter of a common circumscribed circle of the two position-limiting members 711 when the two position-limiting members 711 are close to a certain degree, for example, a max. outside diameter of the common circumscribed circle when the two position-limiting members 711 are attached to each other. Further, as shown in FIG. 28, when the two position-limiting members 711 move away from each other along first direction A in the position-limiting slot 66, the outer diameter of the common circumscribed circle can be greater than a diameter of the inscribed circle of the position-limiting slot 66. Thus, when the T-shaped axis body 52, i.e., the first body 2, rotates around the vertical axis, the two position-limiting members 711 cannot rotate in the position-limiting slot 66 to limit the position. Correspondingly, as shown in FIG. 30, when the two position-limiting members 711 move close to each other and are attached to each other along first direction A, the diameter of the common circumscribed circle of the two position-limiting members 711 can be equal to or smaller than the diameter of the inscribed circle of the position-limiting slot 66. Thus, when T-shaped axis body 52, i.e., the first body 2, rotates around the vertical axis, the two position-limiting members 711 can rotate in the position-limiting slot 66 to release the position limitation. The position-limiting members 711 can be in a semi-cylindrical shape shown in FIG. 26 or any other shapes. Then, the control assembly at least includes the switch rod 83 shown in FIG. 27 and the direction guide groove 87 shown in FIG. 25. The switch rod 83 extends along first direction A. One end of the switch rod 83 (right end in the figure) can be arranged in the direction guide groove 87. The other end of the switch rod 83 (left end in the figure) can be rotatably connected to the position-limiting member 711. Thus, the switch rod 83 can flip with the first body 2 and drive the position-limiting member 711 to move along first direction A. The direction guide groove 87 is arranged at the U-shape connection shell 51 in a V-shape. Openings of two direction guide grooves 87 corresponding to the two switch rods 83 can face each other in first direction A. As shown in FIG. 29, in the initial state, the first body 2 and the second body 3 are stacked. The two direction guide rods 83 can be arranged at openings of the two direction guide grooves 87, i.e., farthest ends. The two position-limiting members 711 are away from each other shown in FIG. 28. When the U-shape connection shell 51 flips with the first body, the direction guide rod 83 can move along the direction guide groove 87 and first direction until the first body 2 moves to the predetermined angle, e.g., 90°. Then, the direction guide rod 83 can move to a pointing end of the direction guide groove 87 shown in FIG. 31. Then, the two position-limiting members 711 can be pushed by the switch rods 83 to move close to each other until the state shown in FIG. 30 can rotate in the position-limiting slot 66. Thus, the first body 2 and the second body 3 can be in the second position relationship. The first body 2 can move in the second motion mode relative to the second body 3. As shown in FIG. 31, the first body 2 continues to move in the first motion mode. The switch rods 83 can move from the bottom of the direction guide groove 87 to the opening end, i.e., the farthest end, again to drive the two position-limiting members 711 to move away from each other again along first direction A to be locked again. In some embodiments, the position-limiting member 711 can be a rigid structure, which cannot be compressed. After the first body 2 reached the predetermined angle, and the first body 2 moves in the second motion mode for a certain degree, i.e., rotate for a certain range (not reach the second lock state), the first body 2 cannot move in the first motion mode again. The first position relationship can be adjusted by adjusting the size of the position-limiting slot 66 in third direction C and the sizes of the two position-limiting members 711. For example, if the sizes of the position-limiting members 711 are small enough, the two position-limiting members 711 can rotate in the position-limiting slot 66 even without being attached to each other in direction a.

In some embodiments, as shown in FIG. 32, the first structure member 71 includes at least one position-limiting member 711. The structure controller can drive the at least one position-limiting member 711 to move forth and back along first direction A. the second structure member 72 includes a first position-limiting slot 721, a second position-limiting slot 722, a third position-limiting slot 723, and a fourth position-limiting slot 724 spaced apart along first direction A. An annular channel 725 around second direction B can be formed between the first position-limiting slot 721 and the second position-limiting slot 722, and between the third position-limiting slot 723 and the fourth position-limiting slot 724.

In some embodiments, the first body 2 can move in the first motion mode to a position satisfying the first position relationship with the second body 3 through the first part 5. The structure controller can drive the at least one position-limiting member 711 to move along first direction A to the position-limiting slot outside the annular channel 725 to satisfy the limitation relationship. The first body 2 can move in the first motion mode to a position satisfying the second position relationship with the second body 3 through the first part 5. The structure controller can drive at least one position-limiting member 711 to move into the annular channel 725 along first direction A to not satisfy the limitation relationship.

In some embodiments, as shown in FIG. 33, the second structure member 72 includes a first position-limiting slot 721 and a fourth position-limiting slot 724 arranged at two ends of the base 65 along first direction A, and a second position-limiting slot 722 and a third position-limiting slot 723 arranged at two ends of the upper chuck 64 along first direction A, which form the annular channel 725. The first structure member 71 includes a position-limiting guide rod 714 shown in FIG. 35. The position-limiting guide rod 714 extends along a direction opposite of second direction B above the T-shape axis body 52 toward the base 65. At least one position-limiting member 711 is arranged at an end of the position-limiting guide rod 714 facing the based 65. Two ends of the position-limiting guide rod 714 above the T-shape axis body 52 along first direction A can be configured to be connected to the control assembly 8. As shown in FIG. 38, when the position-limiting member 711 is in any one of the position-limiting slots, the first body 2 and the second body 3 can be in the first position relationship. Then, when the T-shape axis body 52, i.e., the first body 2, rotates around the vertical axis, the position-limiting member 711 cannot rotate in the slot to limit the position. Correspondingly, as shown in FIG. 40, when the position-limiting member 711 moves in the slot to the annular channel 725 along first direction A, the first body 2 and the second body 3 are in the second position relationship. The position-limiting member 711 can move in the annular channel 725 without being limited by the slot. Further, when the T-shape axis body 52, i.e., the first body 2 rotated around the vertical axis, the position-limiting member 711 can move in the annular channel 725 to release the position limitation. In some embodiments, two position-limiting members 711 are arranged and spaced apart at the bottom of the position-limiting guide rod 714 along first direction A shown in FIG. 35. The two position-limiting members 711 can correspond to the first position-limiting slot 721 and the second position-limiting slot 722, and the third position-limiting slot 723 and the fourth position-limiting slot 724 at two ends along first direction A, respectively. Then, the control assembly at least includes a spiral guide rod 88 shown in FIG. 34, a direction guide groove 87 shown in FIG. 36, and a spiral rod 89 shown in FIG. 37. Two spiral rods 89 can be fixedly arranged at two ends of the T-shape axis body 52 along first direction A. Two spiral guide rods 88 can be spirally sleeved with the two spiral rods 89. Thread groove and protrusion can be adjusted according to the actual design, as long as one has a protrusion and the other one has a groove to achieve cooperation. The spiral guide rod 88 can be connected to the axis center 531 to flip with the first body 2. Thus, the axis center 531 may not require a special structure as long as the axis center 531 is coaxially arranged with the flipping axis 53. Moreover, during the flipping process, the spiral guide rod 88 can move back and forth along first direction A on the spiral rod 89. The spiral guide rod includes a direction guide member 881. The direction guide member 881 can be movably cooperated with the direction guide groove 87. The direction guide groove 87 can be arranged at the U-shape connection shell 51 and extend in a straight line along first direction A. As shown in FIG. 39, in the initial state, the first body 2 and the second body 3 are stacked. The two direction guide members 881 are arranged at a same end of the two direction guide grooves 87, i.e., a very left end or a very right end. Thus, when only one position-limiting member 711 is included, the position-limiting member 711 can be arranged in the first position-limiting slot 721 or the fourth position-limiting slot 724. When U-shape connection shell 51 flips with the first body 2, the direction guide member 881 can move along the direction guide groove 87 in first direction A and drive the position-limiting guide rod 714 and the position-limiting member 711 to move along first direction A until the first body 2 moves to the predetermined angle, e.g., 90°. Then, the direction guide member 881 can move to the middle of the direction guide groove 87 shown in FIG. 41. Thus, the position-limiting member 711 can be pushed into the annular channel 725 between the first position-limiting slot 721 and the second position-limiting slot 722 or between the third position-limiting slot 723 and the fourth position-limiting slot 724. Then, the first body 2 and the second body 3 can be in the second position relationship. The first body 2 can move in the second motion mode relative to the second body 3. Correspondingly, when two position-limiting members 711 are included, in the initial state, one of the two position-limiting members 711 can be in the first position-limiting slot 721, and the other one of the two position-limiting members 711 can be in the third position-limiting slot 723, or one of the two position-limiting members 711 can be in the second position-limiting slot 722, and the other one of the two position-limiting members 711 can be in the fourth position-limiting slot 724. When the U-shape connection shell 51 flips with the first body 2, the direction guide member 881 can move along the direction guide groove 87 in first direction A and drive the position-limiting guide rod 714 and the two position-limiting members 711 to move along first direction A until the first body moves to the predetermined angle, e.g., 90°. Then, the direction guide member 881 can move to the middle of the direction guide groove 87 shown in FIG. 41. Then, the two position-limiting members 711 can be pushed to the annular channel 725 between the first position-limiting slot 721 and the second position-limiting slot 722 and the annular channel 725 between the third position-limiting slot 723 and the fourth position-limiting slot 724, respectively. Then, the first body 2 and the second body 3 can be in the second position relationship. The first body 2 can move in the second motion mode relative to the second body 3. Then, the first body 2 can continue to move in the first motion mode, and the direction guide member 881 can move in the direction guide groove 87 toward the other end again, i.e., drive the position-limiting members 711 to move along first direction A into the second position-limiting slot 722 and/or the fourth position-limiting slot 724 again (including the situation with one position-limiting member 711 and two position-limiting members 711), respectively, to be locked again. Moreover, the position-limiting member 711 can be a rigid structure, which cannot be compressed. Thus, after the first body 2 reaches the predetermined angle, and the first body 2 moves a certain degree in the second motion mode, i.e., rotates for a certain range (not reach the second lock state), the first body 2 cannot move in the first motion mode. Thus, the first position relationship can be adjusted by adjusting the sizes of the four position-limiting slots along first direction A and the sizes of the position-limiting members 711 along first direction A.

Further, a second aspect of embodiments of the present disclosure provides a movement method of the electronic device 1. The method includes the following steps.

Under the first force, the first body 2 can move in the first motion mode relative to the second body 3 through the first part 5 of the connection assembly 4.

Under a second force, the first body 2 can move in the second motion mode relative to the second body 3 through the second part 6 of the connection assembly 4.

The first body 2 can move in the first motion mode to a position satisfying the first position relationship with the second body 3 through the first part 5. The movement of the first body 2 in the second motion mode through the second part 6 can be impacted.

The above are only some embodiments of the present disclosure. However, the scope of protection of the present disclosure is not limited here. Those skilled in the art can think of modifications or replacements in the scope of the present disclosure. These modifications and replacements are within the scope of the present disclosure. The scope of the present disclosure should be subject to the scope of the appended claims.

What is claimed is:

1. An electronic device comprising:
a first body;
a second body;
a connection assembly connecting the first body and the second body and including:
    a first part and a second part; and
    an impact member including a first structure member and a second structure member cooperating with each other; and
a structure controller included in the connection assembly and connected to the impact member;
wherein:
    the first part is configured to allow the first body to move relative to the second body in a first motion mode, and the second part is configured to allow the first body to move relative to the second body in a second motion mode;
    the first body moves in the first motion mode through the first part to a position satisfying a first position relationship with the second body, and impacting a movement of the first body in the second motion mode through the second part;
    when the first body moves in the first motion mode through the first part to a position satisfying a second position relationship with the second body, the movement of the first body in the second motion mode through the second part is not impacted;
    the first structure member is movably arranged between the first part and the second part along a first direction, and the first direction is perpendicular to a direction in which the first body and the second body are stacked;
    the second structure member is arranged at the second part and movably cooperates with the first structure member;
    when the first body moves in the first motion mode through the first part to the position satisfying the first position relationship with the second body, the structure controller drives the first structure to move along the first direction to be snapped with the second structure member to satisfy a limitation relationship; and
    when the first body moves in the first motion mode through the first part to the position satisfying the second position relationship with the second body, the structure controller drives the first structure member to move along the first direction to be independent of the second structure member to not satisfy the limitation relationship.

2. The electronic device according to claim 1, wherein:
the impact member has a first state and a second state, the movement of the first body in the second motion mode is impacted in the first state, and the movement of the first body in the second motion mode is not impacted in the second state; and the structure controller is associated with the movement of the first body in the first motion mode through the first part, and configured to control the impact member to be in the first state when the first body moves in the first motion mode to the position satisfying the first position relationship with the second body through the first part, and control the impact member to be in the second state when the first body moves in the first motion mode to the position satisfying the second position relationship with the second body through the first part.

3. The electronic device according to claim 2, wherein:
the first state includes that the first structure member and the second structure member satisfy the limitation relationship; and
the second state includes that the first structure member and the second structure member do not satisfy the limitation relationship.

4. The electronic device according to claim 1, wherein:
the first structure member is further movably arranged between the first part and the second part along a second direction, and the second direction is the direction in which the first body and the second body are stacked;
when the first body moves in the first motion mode through the first part to the position satisfying the first position relationship with the second body, the structure controller further drives the first structure member to move along the second direction to a position in contact with the second structure member to satisfy the limitation relationship; and
when the first body moves in the first motion mode through the first part to the position satisfying the second position relationship with the second body, the structure controller further drives the first structure member to move along the second direction to be detached from the second structure member to not satisfy the limitation relationship.

5. The electronic device according to claim 1, wherein:
the second structure member includes two position-limiting slots spaced along the first direction, the two position-limiting slots opening face the first part; and
the first structure member includes:
    at least one position-limiting member corresponding to the position-limiting slot;
    a connecting rod extending in a second direction towards the first part, the position-limiting member is connected to the connecting rod in the second direction; and
    an elastic member sleeved outside the connecting rod, two ends of the elastic member abut against the position-limiting member and the connection assembly.

6. The electronic device according to claim 5, wherein:
the first structure member includes two position-limiting members;
the two position-limiting members face each other and are movably arranged along the first direction;
the second structure member is a position-limiting slot arranged along the first direction, and the two position-limiting members move close to or away from each other along the first direction within the position-limiting slot;
when the first body moves in the first motion mode through the first part to the position satisfying the first position relationship with the second body, the structure controller further drives the two position-limiting members to move close to each other along the first direction to a first determined distance to satisfy the limitation relationship; and when the first body moves in the first motion mode through the first part to the position satisfying the second position relationship with the second body, the structure controller further drives the two position-limiting members to move away from each other along the first direction to a second determined distance to not satisfy the limitation relationship.

7. The electronic device according to claim 6, wherein the structure controller includes:

a direction guide groove; and a switch rod extending in the first direction, one end of the switch rod being arranged in the direction guide groove and the other end being rotatably connected to the position-limiting member to be able to drive the position-limiting member in the first direction when the first body moves in the first motion mode through the first part.

8. The electronic device according to claim 5, wherein:

the first structure member includes at least one position-limiting member, and the structure controller drives the at least one position-limiting member to move back and forth along the first direction;

the second structure member includes a first position-limiting slot, a second position-limiting slot, a third position-limiting slot, and a fourth position-limiting slot arranged in sequence and spaced apart along the first direction, and an annular channel around the second direction is formed between the first position-limiting slot and the second position-limiting slot, and between the third position-limiting slot and the fourth position-limiting slot;

when the first body moves in the first motion mode through the first part to the position satisfying the first position relationship with the second body, the structure controller further drives the at least one position-limiting member to move along the first direction into a position-limiting slot outside the annular channel to satisfy the limitation relationship; and when the first body moves in the first motion mode through the first part to the position satisfying the second position relationship with the second body, the structure controller further drives the at least one position-limiting member to move along the first direction into the annular channel to not satisfy the limitation relationship.

9. An electronic device comprising:

a first body;

a second body;

a connection assembly connecting the first body and the second body and including:

a first part and a second part; and an impact member including a first structure member and a second structure member cooperating with each other; and a structure controller included in the connection assembly and connected to the impact member;

wherein:

the first part is configured to allow the first body to move relative to the second body in a first motion mode, and the second part is configured to allow the first body to move relative to the second body in a second motion mode;

the first body moves in the first motion mode through the first part to a position satisfying a first position relationship with the second body, and impacting a movement of the first body in the second motion mode through the second part;

when the first body moves in the first motion mode through the first part to a position satisfying a second position relationship with the second body, the movement of the first body in the second motion mode through the second part is not impacted; and at least one of:

the first structure member includes two position-limiting members, the two position-limiting members face each other and are movably arranged along a first direction, the first direction is perpendicular to a direction in which the first body and the second body are stacked, the second structure member is a position-limiting slot arranged along the first direction, the two position-limiting members move close to or away from each other along the first direction within the position-limiting slot, when the first body moves in the first motion mode through the first part to the position satisfying the first position relationship with the second body, the structure controller drives the two position-limiting members to move close to each other along the first direction to a first determined distance to satisfy a limitation relationship, and when the first body moves in the first motion mode through the first part to the position satisfying the second position relationship with the second body, the structure controller drives the two position-limiting members to move away from each other along the first direction to a second determined distance to not satisfy the limitation relationship; or the first structure member includes at least one position-limiting member, the structure controller drives the at least one position-limiting member to move back and forth along the first direction, the second structure member includes a first position-limiting slot, a second position-limiting slot, a third position-limiting slot, and a fourth position-limiting slot arranged in sequence and spaced apart along the first direction, and an annular channel around the second direction is formed between the first position-limiting slot and the second position-limiting slot, and between the third position-limiting slot and the fourth position-limiting slot, when the first body moves in the first motion mode through the first part to the position satisfying the first position relationship with the second body, the structure controller drives the at least one position-limiting member to move along the first direction into a position-limiting slot outside the annular channel to satisfy the limitation relationship, and when the first body moves in the first motion mode through the first part to the position satisfying the second position relationship with the second body, the structure controller drives the at least one position-limiting member to move along the first direction into the annular channel to not satisfy the limitation relationship.

10. A method for moving an electronic device, comprising:

under a first force, moving a first body in a first motion mode relative to a second body through a first part of a connection assembly, the connection assembly including an impact member, and the impact member including a first structure member and a second structure member cooperating with each other;

under a second force, moving the first body in a second motion mode relative to the second body through a second part of the connection assembly; wherein:

when the first body moves in the first motion mode through the first part to a position satisfying a first position relationship with the second body, movement of the first body in the second motion mode through the second part is impacted;

when the first body moves in the first motion mode through the first part to a position satisfying a second position relationship with the second body, the movement of the first body in the second motion mode through the second part is not impacted;

the electronic device includes a structure controller included in the connection assembly and connected to the impact member;

the first structure member is movably arranged between the first part and the second part along a first direction, and the first direction is perpendicular to a direction in which the first body and the second body are stacked; and the second structure member is arranged at the second part and movably cooperates with the first structure member; and in response to the first body moving in the first motion mode through the first part to the position satisfying the first position relationship with the second body, driving, by the structure controller, the first structure to move along the first direction to be snapped with the second structure member to satisfy a limitation relationship; and in response to the first body moving in the first motion mode through the first part to the position satisfying the second position relationship with the second body, driving, by the structure controller, the first structure member to move along the first direction to be independent of the second structure member to not satisfy the limitation relationship.

11. The method according to claim 10, wherein:
the impact member has a first state and a second state, the movement of the first body in the second motion mode is impacted in the first state, and the movement of the first body in the second motion mode is not impacted in the second state; and the structure controller is associated with the movement of the first body in the first motion mode through the first part, and configured to control the impact member to be in the first state when the first body moves in the first motion mode to the position satisfying the first position relationship with the second body through the first part, and control the impact member to be in the second state when the first body moves in the first motion mode to the position satisfying the second position relationship with the second body through the first part.

12. The method according to claim 11, wherein:
the first state includes that the first structure member and the second structure member satisfy the limitation relationship; and the second state includes that the first structure member and the second structure member do not satisfy the limitation relationship.

13. The method according to claim 10, wherein the first structure member is further movably arranged between the first part and the second part along a second direction, and the second direction is the direction in which the first body and the second body are stacked;

the method further comprising:
in response to the first body moving in the first motion mode through the first part to the position satisfying the first position relationship with the second body, driving, by the structure controller, the first structure member to move along the second direction to a position in contact with the second structure member to satisfy the limitation relationship; and in response to the first body moving in the first motion mode through the first part to the position satisfying the second position relationship with the second body, driving, by the structural controller, the first structure member to move along the second direction to be detached from the second structure member to not satisfy the limitation relationship.

14. The method according to claim 10, wherein:
wherein:
the first structure member includes two position-limiting members;

the two position-limiting members face each other and are movably arranged along the first direction;

the second structure member is a position-limiting slot arranged along the first direction, and the two position-limiting members move close to or away from each other along the first direction within the position-limiting slot;

the method further comprising:
in response to the first body moving in the first motion mode through the first part to the position satisfying the first position relationship with the second body, driving, by the structure controller, drives the two position-limiting members to move close to each other along the first direction to a first determined distance to satisfy the limitation relationship; and in response to the first body moving in the first motion mode through the first part to the position satisfying the second position relationship with the second body, driving, by the structure controller, the two position-limiting members to move away from each other along the first direction to a second determined distance to not satisfy the limitation relationship.

15. The method according to claim 10, wherein:
wherein:
the first structure member includes at least one position-limiting member, and the structure controller drives the at least one position-limiting member to move back and forth along the first direction; and the second structure member includes a first position-limiting slot, a second position-limiting slot, a third position-limiting slot, and a fourth position-limiting slot arranged in sequence and spaced apart along the first direction, and an annular channel around the second direction is formed between the first position-limiting slot and the second position-limiting slot, and between the third position-limiting slot and the fourth position-limiting slot;

the method further comprising:
in response to the first body moving in the first motion mode through the first part to the position satisfying the first position relationship with the second body, driving, the structure controller, the at least one position-limiting member to move along the first direction into a position-limiting slot outside the annular channel to satisfy the limitation relationship; and in response to the first body moving in the first motion mode through the first part to the position satisfying the second position relationship with the second body, driving, by the structure controller, the at least one position-limiting member to move along the first direction into the annular channel to not satisfy the limitation relationship.

\* \* \* \* \*